United States Patent
Nobayashi

(10) Patent No.: US 11,002,538 B2
(45) Date of Patent: May 11, 2021

(54) DEVICE, METHOD, AND MEDIUM FOR MEASURING DISTANCE INFORMATION USING A PARALLAX CALCULATED FROM MULTI-VIEWPOINT IMAGES

(71) Applicant: CANON KABUSHIKI KAISHA, Tokyo (JP)

(72) Inventor: Kazuya Nobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 16/163,784

(22) Filed: Oct. 18, 2018

(65) Prior Publication Data
US 2019/0128669 A1 May 2, 2019

(30) Foreign Application Priority Data
Oct. 27, 2017 (JP) .............................. JP2017-207992

(51) Int. Cl.
*G01C 3/08* (2006.01)
*H04N 5/357* (2011.01)
*H04N 5/225* (2006.01)
*G03B 35/10* (2021.01)

(52) U.S. Cl.
CPC ............. *G01C 3/085* (2013.01); *G03B 35/10* (2013.01); *H04N 5/2254* (2013.01); *H04N 5/3572* (2013.01)

(58) Field of Classification Search
CPC .... G01C 3/085; H04N 5/3572; H04N 5/2254; G03B 35/10; G03B 13/20
See application file for complete search history.

(56) References Cited

U.S. PATENT DOCUMENTS

| | | | |
|---|---|---|---|
| 8,390,703 B2 | 3/2013 | Iijima et al. | |
| 2008/0273758 A1* | 11/2008 | Fuchs | G01S 7/497 382/106 |
| 2010/0283837 A1* | 11/2010 | Oohchida | H04N 13/239 348/47 |
| 2011/0292182 A1* | 12/2011 | Ogasahara | H04N 13/128 348/47 |
| 2013/0027587 A1* | 1/2013 | Matsui | H04N 5/2226 348/241 |
| 2014/0140579 A1* | 5/2014 | Takemoto | G01C 3/08 382/106 |
| 2015/0175073 A1* | 6/2015 | Graef | G06T 5/005 348/47 |
| 2019/0128669 A1* | 5/2019 | Nobayashi | G01C 3/085 |

FOREIGN PATENT DOCUMENTS

WO 2010/010707 A1 1/2012

* cited by examiner

*Primary Examiner* — Hwa Andrew Lee
(74) *Attorney, Agent, or Firm* — Cowan, Liebowitz & Latman, P.C.

(57) ABSTRACT

A distance measurement device includes a first acquisition unit configured to acquire distance information on the basis of a plurality of images captured at different viewpoints, a second acquisition unit configured to acquire correction information of the distance information on the basis of a plurality of images captured at a timing different from the plurality of images used by the first acquisition unit, and a correction unit configured to correct the distance information on the basis of the correction information.

9 Claims, 16 Drawing Sheets

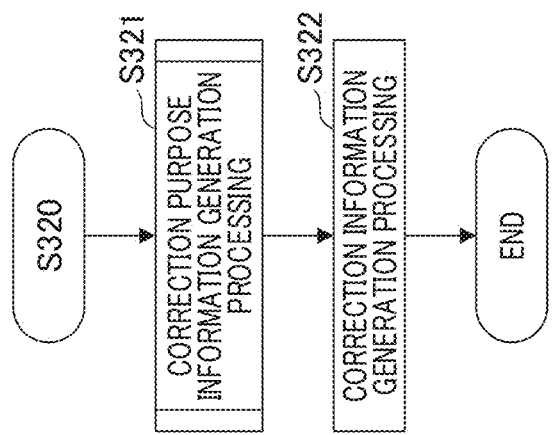
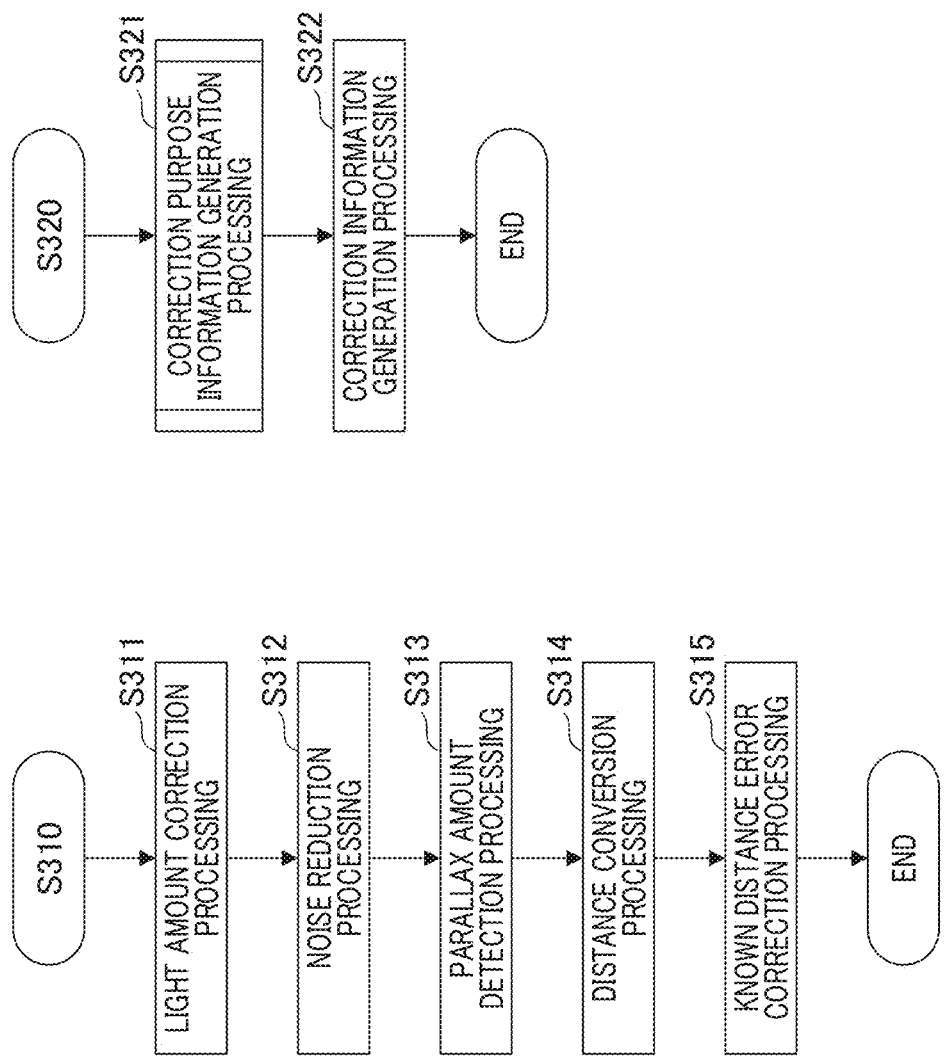
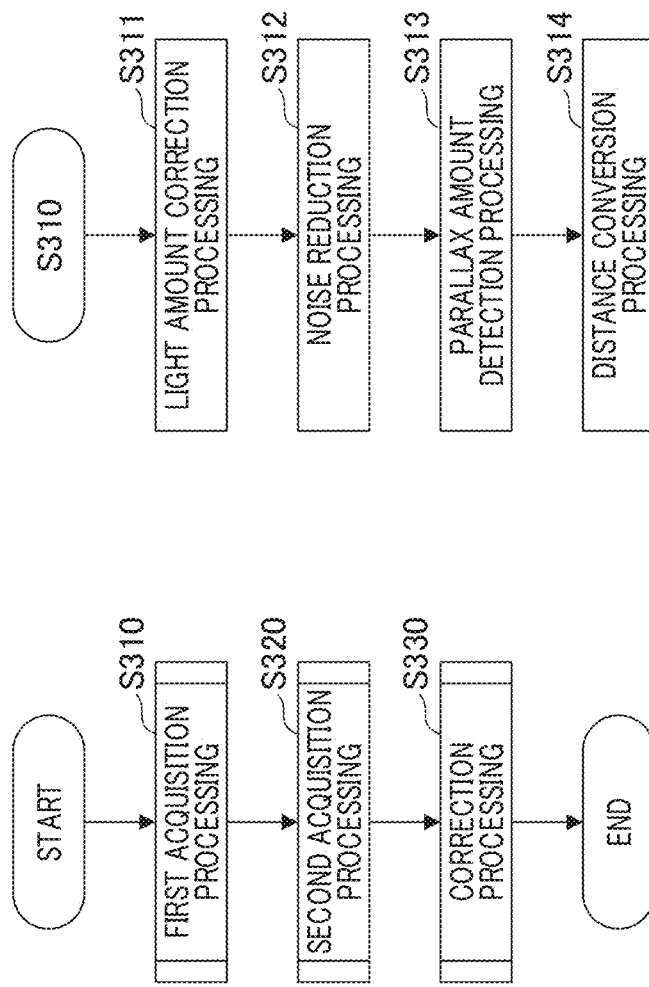

950  951

DEVICE, METHOD, AND MEDIUM FOR MEASURING DISTANCE INFORMATION USING A PARALLAX CALCULATED FROM MULTI-VIEWPOINT IMAGES

BACKGROUND OF THE INVENTION

Field of the Invention

The present invention relates to a distance measurement device, a distance measurement system, an imaging apparatus, a moving body, a method of controlling a distance measurement device, a method of controlling a distance measurement system, and a program.

Description of the Related Art

In an imaging apparatus such as a digital still camera or a digital video camera, an imaging apparatus including a distance measurement function capable of acquiring a distance from the imaging apparatus to a subject has been proposed. For example, as the imaging apparatus including the distance measurement function, there is a stereo imaging apparatus in which two imaging apparatuses are disposed in parallel and a distance to a subject is detected by a phase difference method. The stereo imaging apparatus detects a relative image deviation amount (so-called a parallax amount) between image signals respectively output from the two imaging apparatuses by using a cross-correlation calculation and converts the relative image deviation amount into the distance to the subject through a predetermined conversion coefficient.

In addition, a solid state imaging device of an imaging surface phase difference distance measurement method in which pixels having a distance measurement function are disposed in some or all of the pixels of the imaging device and the distance to the subject is detected by the phase difference method has been proposed. In the imaging surface phase difference distance measurement method, two image signals based on an image generated by a light flux having passed through different pupil regions of an imaging optical system provided in the imaging apparatus are acquired, and the image deviation amount of images between the two image signals is detected by a method similar to the parallax amount detection method of the stereo imaging apparatus. In addition, the detected deviation amount of the images is converted into the distance to the subject through a predetermined conversion coefficient. In addition, in the imaging surface phase difference distance measurement method, it is possible to generate an image signal for viewing by combining the two image signals. In any distance measurement method, the detected parallax amount is converted into the distance to the subject through a predetermined conversion coefficient. Therefore, in order to reduce error at the time of the distance measurement, it is necessary to calculate the parallax amount with high accuracy and to use a conversion coefficient with small error.

In the imaging apparatus having such a distance measurement function, a relationship between the optical system and the imaging device is shifted due to expansion and contraction of a lens and a lens barrel due to heat and a distance measurement error occurs in some cases. In PCT International Publication No. WO2010/010707, a correction coefficient for correcting such a distance measurement error is created using a temperature detected by a temperature sensor. However, in PCT International Publication No. WO2010/010707, a separate temperature sensor is necessary and only the temperature in the vicinity of the temperature sensor is detected. Therefore, in a case where there is a distribution (variation) in the temperature on a sensor surface or the lens, it is impossible to accurately detect a temperature change and it may not be possible to correct the distance measurement error with high accuracy in some cases.

SUMMARY OF THE INVENTION

The present invention provides a distance measurement device that is a distance measurement device that generates distance information from images of a plurality of different viewpoints obtained from an imaging device and which can reduce the influence of an error with time.

A distance measurement device of the present invention includes a first acquisition unit configured to acquire first distance information on the basis of a first image group imaged at different viewpoints and acquire second distance information on the basis of a second image group imaged at a timing different from the first image group, a second acquisition unit configured to acquire correction information of the distance information on the basis of the second image group, and a correction unit configured to correct the first distance information on the basis of the correction information.

Further features of the present invention will become apparent from the following description of exemplary embodiments with reference to the attached drawings.

BRIEF DESCRIPTION OF THE DRAWINGS

FIGS. 4A to 4D are flowcharts illustrating an operation of the distance measurement device.

DESCRIPTION OF THE EMBODIMENTS

First Exemplary Embodiment

<Configuration of Imaging Apparatus>

Figure 1A:
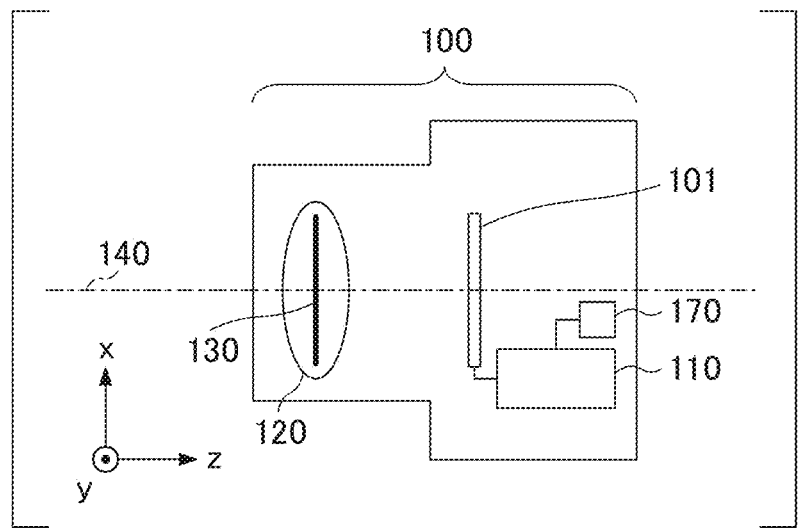
FIGS. 1A to 1C are diagrams for explaining a configuration of an imaging apparatus and an imaging device.

FIG. 1A is a diagram schematically illustrating a configuration of an imaging apparatus 100. The imaging apparatus 100 may be an arbitrary electronic apparatus having a camera function such as a camera such as a digital camera or a digital video camera, a mobile phone having a camera function, or a computer having a camera. The imaging apparatus 100 includes an imaging optical system 120, an imaging device 101, a distance measurement device 110, and an information storage unit 170.

The imaging optical system 120 is a photographing lens of the imaging apparatus 100 and has a plurality of lens groups. The imaging optical system 120 has an exit pupil 130 at a position separated from the imaging device 101 by a predetermined distance and forms an image of a subject on the imaging device 101. In addition, in the present exemplary embodiment, a z-axis is an axis parallel with an optical axis 140 of the imaging optical system 120. In addition, an x-axis and a y-axis are perpendicular to each other and are axes perpendicular to the optical axis.

The distance measurement device 110 is able to be configured using a logic circuit. In addition, as another form of the distance measurement device 110, the distance measurement device 110 may be configured to include a central processing unit (CPU) and a memory that stores an arithmetic processing program. For example, the information storage unit 170 is a memory and stores a light amount correction value and the like. In addition, the information storage unit 170 is also used in temporarily storing information such as an image group.

<Configuration of Imaging Device>

The imaging device 101 is an imaging device having a distance measurement function by an imaging surface phase difference distance measurement method. For example, the imaging device 101 is a complementary metal oxide semiconductor (CMOS) or a charge coupled device (CCD). Photoelectric conversion is performed on a subject image formed on the imaging device 101 through the imaging optical system 120 by the imaging device 101, and an image signal based on the subject image is acquired. A color image is generated by implementing developing processing with respect to the acquired image signal by an image generation unit (not shown). The generated color image is stored in an image storage unit (not shown).

Figure 1B:
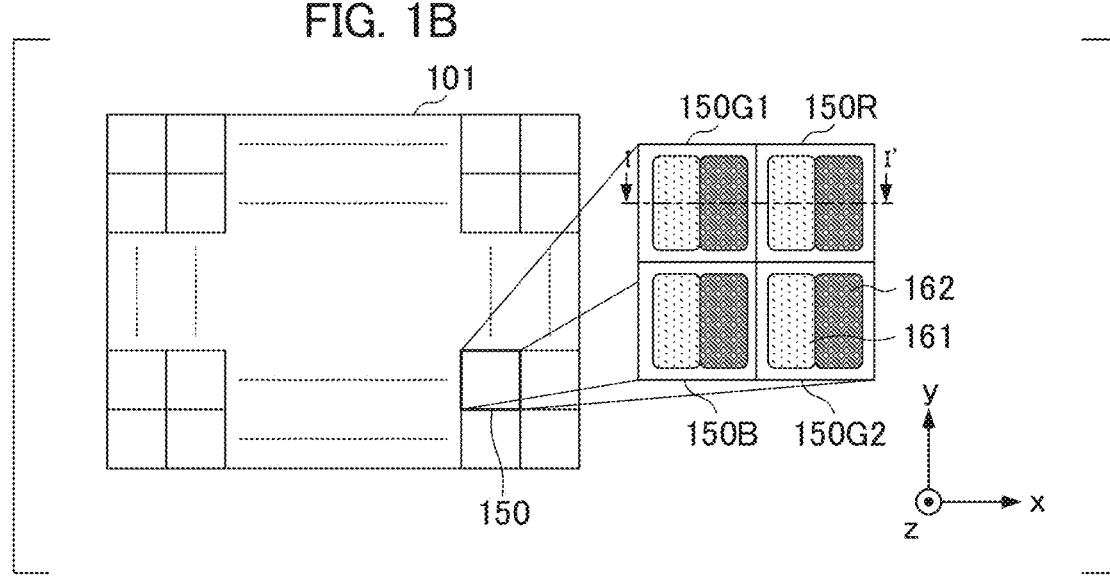

FIG. 1B is an xy cross-sectional view of the imaging device 101. A plurality of pixel groups 150 of 2 rows×2 columns are arranged in the imaging device 101. In the pixel group 150, a green pixel 150G1 and a green pixel 150G2 are disposed diagonally and a red pixel 150R and a blue pixel 150B are disposed in the other two pixels.

Figure 1C:
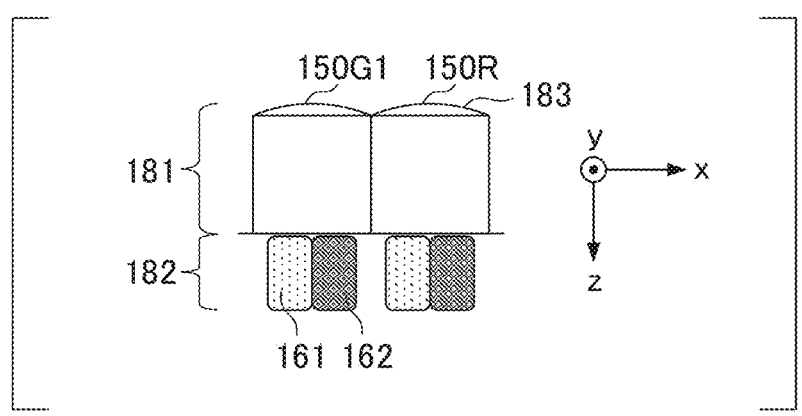

FIG. 1C is a diagram schematically illustrating an I-I' cross section of the pixel group 150. Each pixel has a light receiving layer 182 and a light guide layer 181. The light receiving layer 182 includes two photoelectric conversion units (a first photoelectric conversion unit 161 and a second photoelectric conversion unit 162) for performing a photoelectric conversion on received light. The light guide layer 181 includes a microlens 183 for efficiently guiding the light flux incident on the pixel to the photoelectric conversion unit, a color filter (not shown) for passing light of a predetermined wavelength band, and wiring (not shown) for image reading and pixel driving. In the present exemplary embodiment, an example of the photoelectric conversion unit divided into two in one pupil division direction (the x-axis direction) has been described, but the pupil division direction and the number of the divisions are arbitrary, and for example, an imaging device including a photoelectric conversion unit divided in two pupil division directions (the x-axis direction and the y-axis direction) may be used.

<Distance Measurement by Imaging Surface Phase Difference Distance Measurement Method>

Figure 2A:
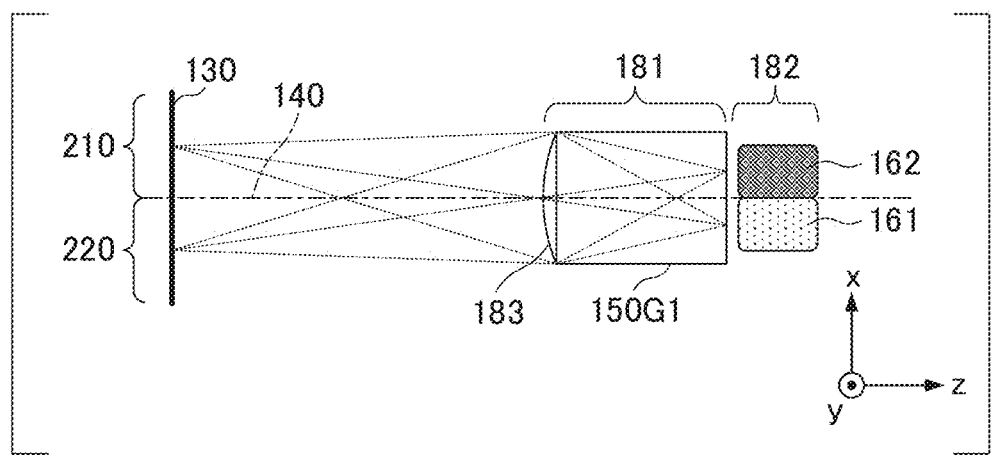
FIGS. 2A to 2D are diagrams for explaining a light flux received by the imaging device and a parallax amount.

The light flux received by the first photoelectric conversion unit 161 and the second photoelectric conversion unit 162 included in the imaging device 101 will be described using FIG. 2A. FIG. 2A is a diagram for explaining the light flux to be received. In FIG. 2A, an outline of the exit pupil 130 of the imaging optical system 120 and the green pixel 150G1 as a representative example of the pixel disposed in the imaging device 101 are shown. The micro lens 183 in the pixel 150G1 is disposed so that the exit pupil 130 and the light receiving layer 182 have an optically conjugate relationship. As a result, as shown in FIG. 2A, the light flux having passed through a first pupil region 210 that is a partial pupil region included in the exit pupil 130 is incident on the first photoelectric conversion unit 161. Similarly, the light flux having passed through a second pupil region 220 that is a partial pupil region is incident on the second photoelectric conversion unit 162.

A plurality of first photoelectric conversion units 161 provided in each pixel perform photoelectric conversion on the received light flux and generate a first image signal. In addition, similarly, a plurality of second photoelectric conversion units 162 provided in each pixel perform photoelectric conversion on the received light flux and generate a second image signal. It is possible to obtain an intensity distribution of the image formed on the imaging device 101 by the light flux mainly passing through the first pupil region 210 from the first image signal. Similarly, it is possible to obtain an intensity distribution of the image formed on the imaging device 101 by the light flux mainly passing through the second pupil region 220 from the second image signal.

Figure 2B:
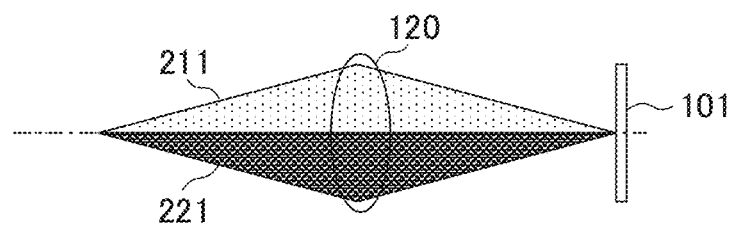
Figure 2C:
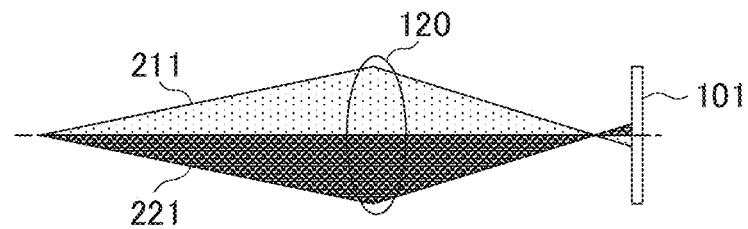
Figure 2D:
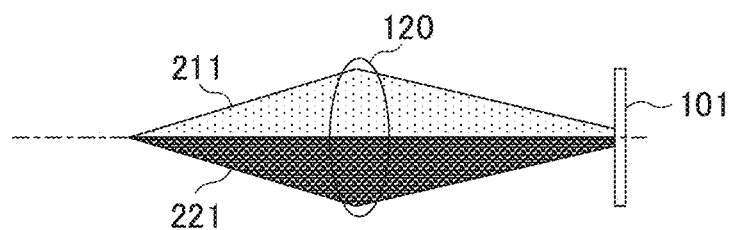

The parallax amount between the first image signal and the second image signal is an amount corresponding to a defocus amount. A relationship between the parallax amount and the defocus amount will be described using FIGS. 2B to 2D. FIGS. 2B to 2D are diagrams for explaining the parallax amount. In FIGS. 2B to 2D, an outline of the imaging device 101, the imaging optical system 120, and the light flux is shown. A first light flux 211 indicates a first light flux passing through the first pupil region 210 and a second light flux 221 indicates a light flux passing through the second pupil region 220.

FIG. 2B shows a state at the time of focusing, and the first light flux 211 and the second light flux 221 converge on the imaging device 101. At the time of focusing, the relative positional deviation amount between the first image signal formed by the first light flux 211 and the second image signal formed by the second light flux 221 is zero. FIG. 2C shows a state in which defocusing is performed in a negative direction of the z-axis on an image side. In the state in which defocusing is performed in the negative direction of the z-axis, the relative positional deviation amount between the first image signal formed by the first light flux and the second image signal formed by the second light flux is not zero and has a negative value. FIG. 2D shows a state in which defocusing is performed in a positive direction of the z-axis on the image side. In the state in which defocusing is performed in the positive direction of the z-axis, the relative positional deviation amount between the first image signal formed by the first light flux and the second image signal formed by the second light flux is not zero and has a positive value.

From a comparison between FIGS. 2C and 2D, it can be understood that the direction of the positional deviation is switched according to whether the defocus amount is positive or negative. In addition, from a geometric relationship, it can be understood that parallax occurs according to the defocus amount. Therefore, it is possible to detect the parallax amount between the first image signal and the second image signal by a region-based matching method that will be described later and convert the detected parallax amount into the defocus amount through a predetermined conversion coefficient. In addition, it is possible to convert the defocus amount into a distance (hereinafter, referred to as a subject distance) from the subject to the imaging apparatus 100 by using an imaging relationship of the imaging optical system 120 that will be described using Formula 2 that will be described later.

<Description of Distance Measurement Device>

Figure 3:
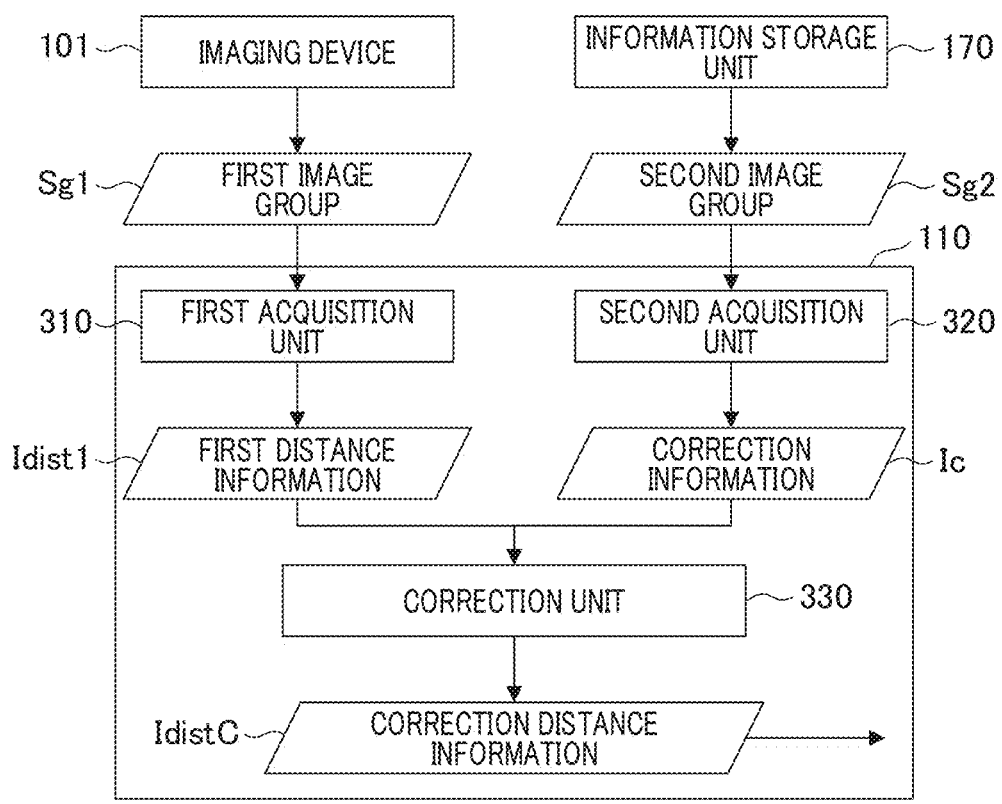
FIG. 3 is a diagram for explaining a distance measurement device.

The distance measurement device 110 of the present exemplary embodiment will be described. FIG. 3 is a block diagram illustrating a schematic configuration of the distance measurement device 110. The distance measurement device 110 includes a first acquisition unit 310, a second acquisition unit 320, and a correction unit 330. The distance measurement device 110 acquires distance information by the first acquisition unit 310 and acquires correction information Ic by the second acquisition unit 320. In addition, the correction unit 330 corrects first distance information Idist1 using the correction information Ic to generate and output correction distance information IdistC.

In the following description, details of processing performed by the first acquisition unit 310, the second acquisition unit 320, and the correction unit 330 will be described. FIG. 4A is a flowchart illustrating an operation of the distance measurement device 110.

In step S310, the first acquisition unit 310 acquires the first distance information Idist1 indicating the distance to the subject using a first image group Sg1 acquired from the imaging device 101. The first image group Sg1 includes a first image signal S11 generated by the first photoelectric conversion unit 161 and a second image signal S12 generated by the second photoelectric conversion unit 162.

In step S320, the second acquisition unit 320 acquires the correction information Ic for correcting the first distance information Idist1 using a second image group Sg2 acquired from the information storage unit 170. The second image group Sg2 includes a first image signal S21 and a second image signal S22 imaged at a plurality of timings different from those of the first image group Sg1 using the imaging apparatus 100. That is, the second image group Sg2 is an image group in which the first image group Sg1 is accumulated in the information storage unit 170. Note that the first image signal S21 is an image signal generated by the first photoelectric conversion unit 161 and the second image signal S22 is an image signal generated by the second photoelectric conversion unit 162.

In step S330, the correction unit 330 corrects the first distance information Idist1 using the correction information Ic. The correction unit 330 corrects some of or the entire distance information of the first distance information Idist1 using an image side correction amount included in the correction information Ic. That is, an image surface position of the imaging optical system 120 of a current state and a position of the imaging device 101 are determined from an estimated image side change amount and are converted into correction distance information IdistC indicating the subject distance using Formula 2 that will be described later.

Next, details of the processing in steps S310 to S330 will be described. First, specific details of processing of step S310 will be described using FIG. 4B. FIG. 4B is a flowchart illustrating first acquisition processing.

In step S311, the first acquisition unit 310 performs light amount correction processing for correcting a light amount of the first image signal S11 and the second image signal S12. In the vicinity of an image angle of the imaging optical system 120, shapes of the first pupil region 210 and the second pupil region 220 are different from each other due to vignetting, and thus a light amount balance between the first image signal S11 and the second image signal S12 breaks down. Therefore, the first acquisition unit 310 performs light amount correction between the first image signal S11 and the second image signal S12 using a light amount correction value stored in the information storage unit 170. Note that it is not always necessary to use the light amount correction value stored in the information storage unit. For example, the light amount correction value may be generated from an area ratio between the first pupil region 210 and the second pupil region 220 and the light amount correction may then be performed.

In step S312, the first acquisition unit 310 performs noise reduction processing for reducing noise added by the imaging device 101. Specifically, the first acquisition unit 310 performs filtering processing using a band pass filter that transmits only a specific frequency band on the first image signal S11 and the second image signal S12. The light amount correction in step S311 is not always in accordance with a design value due to manufacturing error of the imaging optical system 120 or the like. Therefore, in addition, it is desirable to use a band pass filter having a transmission rate of 0 in a frequency band where a spatial frequency is zero and a low transmission rate in a high frequency band. In addition, generally, as the frequency band of which the spatial frequency becomes higher, an SN ratio (a ratio of a signal component and a noise component) decreases, and the noise component relatively increases. Therefore, a so-called low pass filter in which the transmission rate becomes lower as the frequency becomes higher may be used in the noise reduction processing.

In step S313, the first acquisition unit 310 performs parallax amount detection processing for calculating the parallax amount between the first image signal S11 and the second image signal S12. Specifically, first, a point of interest of interest is set in the first image signal S11 and a collation region centered on the point of interest is set. For example, the collation region may be a rectangle having a predetermined length on one side centered on the point of interest. Note that the collation region is not limited to a rectangle and may be modified. Next, a reference point is set in the second image signal S12 and a reference region centered on the reference point is set. The reference region has the same size and shape as the collation region. A correlation degree between the first image signal S11 included in the collation region and the second image signal S12 included in the reference region is calculated while sequentially moving the reference point, and a reference point with the highest correction is set as a corresponding point corresponding to the point of interest. A relative positional deviation amount between the point of interest and the corresponding point is the parallax amount at the point of interest. The first acquisition unit 310 is able to calculate the parallax amount at a plurality of pixel positions by calculating the parallax amount while sequentially changing the point of interest.

As a method of calculating the correlation degree, a known method is able to be used. For example, normalized cross-correlation (NCC) for evaluating a normalized cross-correlation between image signals or a sum of squared difference (SSD) for evaluating a sum of squared differences in image signal conversion is able to be used. In addition, sum of absolute difference (SAD) for evaluating an absolute value of a difference is also able to be used. In addition, in a case of such a method using the correlation degree, it is possible to generate reliability information indicating the reliability of the calculated distance information using texture, amount, or frequency component information of each pixel block.

In step S314, the first acquisition unit 310 performs distance conversion processing for converting the parallax amount into a distance (a defocus amount) from the imaging device 101 to a focal point of the imaging optical system 120 using a predetermined conversion coefficient. Hereinafter, a coefficient for converting the parallax amount into the defocus amount is referred to as a BL value. When the BL value is set as BL, the defocus amount is set as $\Delta L$, and the parallax amount is set as d, the parallax amount d is able to be converted into the defocus amount $\Delta L$ by Formula 1.

$$\Delta L = BL \times d \quad \text{(Formula 1)}$$

The first acquisition unit 310 is able to acquire the first distance information Idist1 including the defocus amount at the plurality of pixel positions as the distance information by converting the parallax amount into the defocus amount at the plurality of pixel positions.

In step S315, the first acquisition unit 310 performs known distance error correction processing for correcting the distance information with respect to a known error of the first distance information Idist1 as necessary. In the known distance error correction processing, in particular, correction processing related to a cause of error that does not change with time is performed. In the present exemplary embodiment, although a design-caused error, a calculation-caused error, a subject-caused error, and a manufacturing and assembly error will be described, since there are many causes in relation to the error that is not changed with time, other error correction processing may be performed.

The design-caused error is an error in which the distance changes within the image angle due to a curvature of the image surface, the vignetting, or various aberrations at the time of optical design. The design-caused error is able to be corrected by correction data at each object distance•each image angle calculated on the basis of the design data.

The calculation-caused error is an error generated in steps S311 to S314. As much as possible, each step is performed with high accuracy so that an error is not generated in each step, but regarding a remaining calculation-caused error, it is possible to suppress the error by, for example, spatial filtering processing of the distance information.

The subject-caused error is an error generated by a contrast or a color of the subject. For example, due to an influence of an axial chromatic aberration of the imaging optical system, the defocus amount $\Delta L$ changes by the color of the subject. The subject-caused error is corrected according to the design information in accordance with color information of the first image signal S11.

The manufacturing and assembly error is an error generated at the time of manufacturing and assembling and varies by each individual. Therefore, in order to correct the manufacturing and assembling error, correction data is generated for each individual by actually capturing an image or the like to correct the error.

In addition, in the distance measurement device 110 of the present exemplary embodiment, after the first acquisition unit 310 acquires the first image group Sg1 at the time of imaging, the first image group Sg1 is used as the second image group Sg2 in acquiring the correction information Ic. Therefore, after acquiring the first distance information Idist1, the first image group Sg1 is stored in the information storage unit 170 as the second image group Sg2.

Next, specific details of processing of step S320 will be described using FIG. 4C. FIG. 4C is a flowchart illustrating the second acquisition processing.

In step S321, the second acquisition unit 320 performs correction purpose information generation processing for generating information (correction purpose information) for generating the correction information on the basis of the second image group Sg2. Specifically, the second acquisition unit 320 acquires the first image signal S21 and the second image signal S22 imaged at the same timing from the second image group Sg2 stored in the information storage unit 170 and generates the correction purpose information.

Figure 4D:
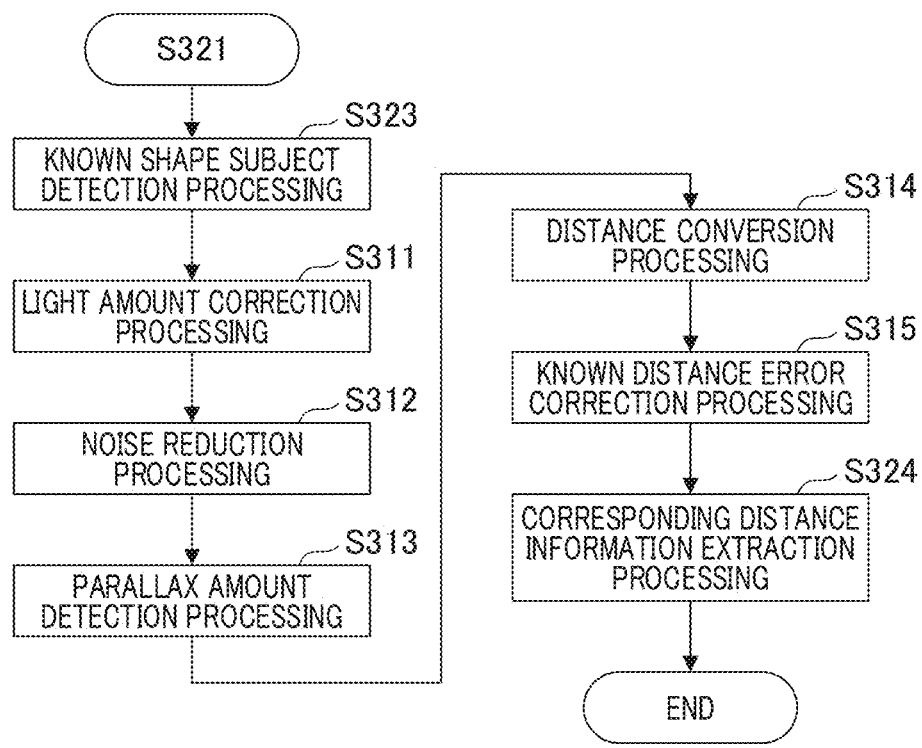

Details of the correction purpose information generation processing (step S321) will be described using FIG. 4D. FIG. 4D is a flowchart illustrating an operation of the correction purpose information generation processing.

Figure 5A:
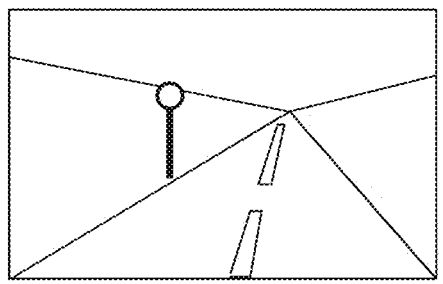
FIGS. 5A to 5D are diagrams for explaining known shape subject detection processing.
Figure 5B:
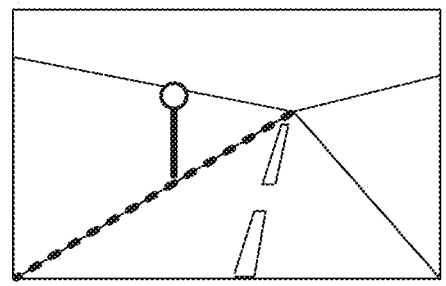
Figure 5C:
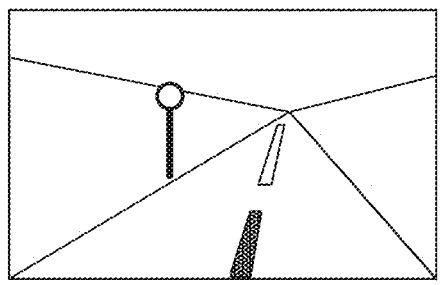
Figure 5D:
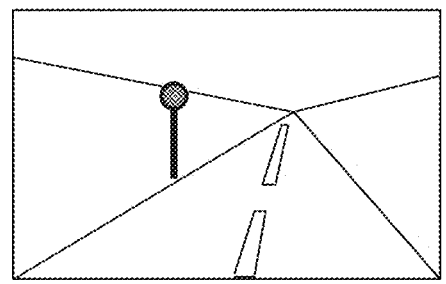

In step S323, the second acquisition unit 320 performs known shape subject detection processing for detecting a pixel position (known shape subject information) of a specific subject of which a shape is estimated to be known, by using the first image signal S21 acquired from the second image group Sg2. An example of the known shape subject detection processing will be described using FIGS. 5A to 5D. FIG. 5A is a diagram illustrating the first image signal S21, and FIGS. 5B to 5D are diagrams illustrating a detection result of the known shape in the first image signal S21.

The specific subject is a target in which a known object such as a straight line portion, a white line, or a sign is detected. First, extraction of the straight line portion will be described. Any method may be used as a straight line extraction method. For example, it is assumed that a distortion aberration of the imaging optical system 120 is corrected in the first image signal S21, and it is possible to extract the straight line portion using Hough transformation. FIG. 4B shows a part of a road side band of a road as the extracted straight line (a dotted line portion). In addition, in FIG. 4B, although a result of extracting one straight line portion is shown, a plurality of straight line portions may be detected.

Next, an extraction of an object of a known shape will be described. As a known shape, a flat portion or other objects are extracted. As a method of recognizing a known shape portion in the first image signal S21 and extracting a region thereof, for example, there is semantic segmentation. In addition, in addition to this, there are various methods, but a method of learning and identifying from a database in advance is mainstream, and in recent years, highly accurate identification has been performed using deep learning. FIG. 5C illustrates an example in which a white line indicated by shading is recognized and FIG. 5D illustrates an example in which a sign indicated by shading is recognized. Since a size and the like of the white line or the sign are determined, information on the white line or the sign is also able to be used in the correction processing. In addition, in a case where the subject is a road surface, a person, a car, or an interior, the road surface, the person, the car, or the interior may be handled as the subject of a known shape in a case where a shape such as a wall or a floor is known.

After the known shape subject detection processing (step S323), the same processing as steps S311 to S315 is performed. After calculating the parallax amount between the first image signal S21 and the second image signal S22 at the plurality of pixel positions, the parallax amount at each pixel position is converted into the defocus amount by Formula 1. Hereinafter, the calculated defocus amount will be described as the distance information.

Figure 6A:
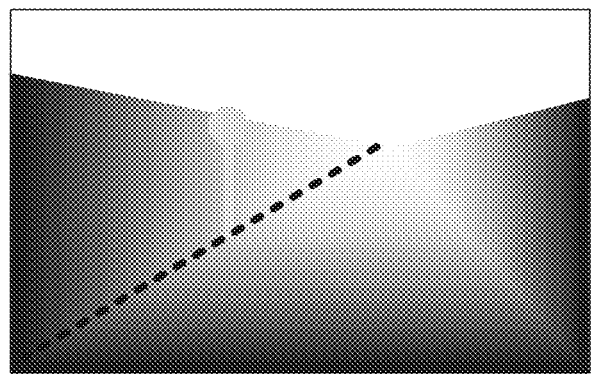
FIGS. 6A and 6B are diagrams for explaining distance information, a subject distance, and a position change on an image signal.

In step S324, the second acquisition unit 320 performs corresponding distance information extraction processing for extracting the distance information corresponding to the known shape subject information on the basis of the distance information calculated using the processing of steps S311 to S315. Hereinafter, as an example, a case where the straight line portion shown in FIG. 5B is detected as the known shape will be described. FIG. 6A is a diagram illustrating distance information corresponding to FIG. 5B. A dotted line portion of FIG. 6A indicates the detected straight line portion. In the corresponding distance information extraction processing, the position (the dotted line portion) of the known shape subject information and the distance information of the corresponding position are extracted as the correction purpose information.

The second image group Sg2 includes a plurality of pairs of the first image signal S21 and the second image signal S22 imaged at the same timing. Hereinafter, the pair of the first image signal S21 and the second image signal S22 imaged at the same timing is referred to as an image signal pair. Since each of the image signal pairs included in the second image group Sg2 are imaged at different timings, the positions of the known shape subjects are different for each image signal pair. In the distance measurement device 110 of the present exemplary embodiment, a plurality of pieces of correction purpose information in which at least one of the image angle and the distance is different are generated by performing the correction purpose information generation processing on the plurality of image signal pairs.

In step S322, the second acquisition unit 320 performs the correction information generation processing for generating the correction information for correcting the distance measurement error caused by a change with time of the imaging apparatus 100, using the plurality of pieces of correction purpose information generated by the correction purpose information generation processing S321. The correction purpose information includes the defocus amount as the distance information. In converting the focus amount into the subject distance, a formula of a lens in geometrical optics is used. In a case where the distance from an object surface to a principal point of the imaging optical system 120 is set to A, a distance from the principal point of the imaging optical system 120 to the image surface is set to B, and a focal distance of the imaging optical system 120 is set to f, the formula of the lens is expressed as Formula 2.

$$1/A+1/B=1/f \qquad \text{(Formula 2)}.$$

In Formula 2, the focal distance f is a known value. In addition, the distance B from the principal point of the imaging optical system 120 to the image surface is able to be calculated using the defocus amount. Therefore, it is possible to calculate a distance A to the object surface using the focal distance and the defocus amount.

Figure 6B:
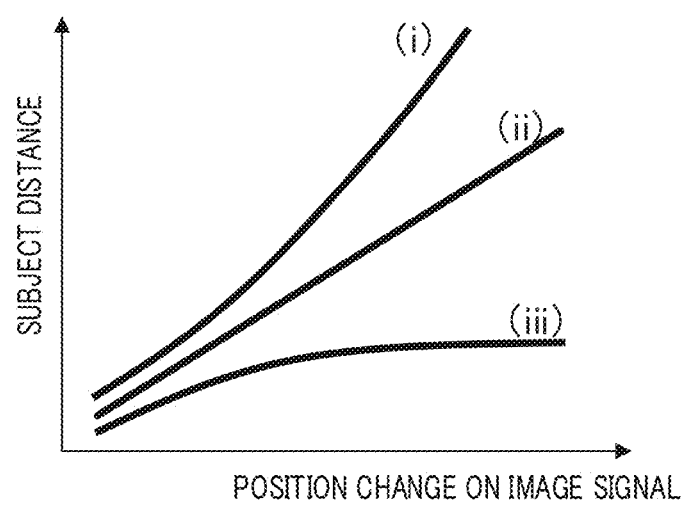

FIG. 6B is a diagram illustrating the subject distance and a position change on the image signal. In a case where there is no change with time in the imaging apparatus 100, the subject distance estimated for the position change on the image signal of the straight line portion detected in the known shape subject detection processing (step S321) becomes a straight line portion shown in (ii) of FIG. 6B. On the other hand, in a case where a change with time occurs in the imaging apparatus 100 due to an influence of changes in temperature and humidity, a vibration, or the like, the subject distance becomes a curve shown in (i) or (iii) of FIG. 6B and does not become a straight line. Therefore, unless the change with time is corrected, a large distance measurement error occurs.

As a cause of the distance measurement error, there are a plurality of causes. For example, the factors are that a difference between an assumed image surface position of the imaging optical system 120 and an actual image surface position occurs, and a conversion relationship between the defocus amount and the distance from the object surface to the principal point of the imaging optical system 120 breaks down. Hereinafter, the difference between the assumed image surface position and the actual image surface position of the imaging optical system 120 is referred to as an image side change amount. Even in a case where the image side change amount is not zero, since the relationship between the defocus amount and the object distance follows Formula 2, as long as the defocus amount is corrected using a correctly estimated image side change amount, the relationship shown in FIG. 6B becomes a straight line. In the correction information generation processing (step S322), the correction information Ic is generated by estimating the image side change amount in which the relationship of FIG. 6B becomes a straight line by using the plurality of pieces of correction purpose information having different image angles and distances.

Figure 7A:
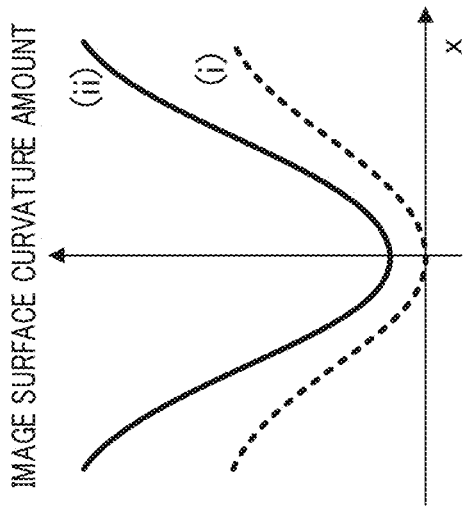
FIGS. 7A to 7C are diagrams for explaining an image surface curvature amount and an image side change amount.
Figure 7B:
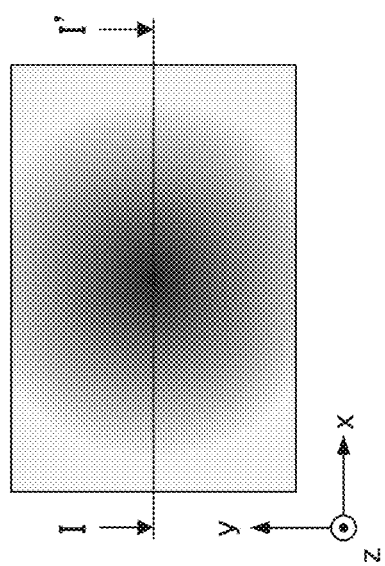

There are a plurality of causes that cause the image side change amount≠0 in the change with time due to the change in temperature and humidity, the vibration, or the like. However, as an example, a case where an optical characteristic of the imaging optical system 120 changes with time due to the temperature change will be described. FIG. 7A is a diagram illustrating a two-dimensional distribution of an image surface curvature amount of the imaging optical system 120 within an effective pixel range of the imaging device 101. FIG. 7B is a diagram illustrating the image surface curvature amount along I-I' of FIG. 7A. (i) of FIG. 7B illustrates the image surface curvature amount when the change with time is not generated and (ii) of FIG. 7B illustrates the image surface curvature amount when the change with time is generated. A difference between (i) and (ii) of FIG. 7B is the image side change amount described above.

Figure 7C:
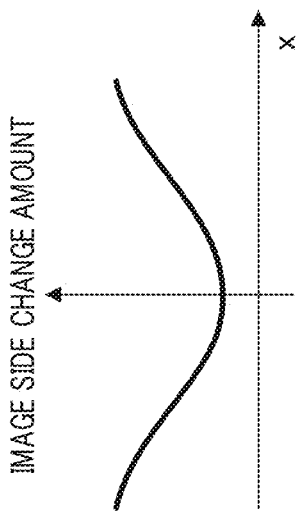

FIG. 7C is a diagram illustrating the image side change amount along I-I' of FIG. 7A. In a case where the image side change amount is a constant value irrespective of the image angle, it is desirable that there is at least one piece of correction purpose information. However, as shown in FIG. 7C, in a case where the change with time occurs in the optical characteristics of the imaging optical system 120, the image side change amount changes according to the image angle. Therefore, in a case where the image side change amount changes according to the image angle, it is difficult to estimate the image side change amount using only one piece of correction purpose information. In a case where the image side change amount changes according to the image angle, it is necessary to estimate the two-dimensional distribution of the image side change amount using the correction purpose information acquired from the plurality of subjects of which the image angles and the subject distances are different.

Figure 8A:
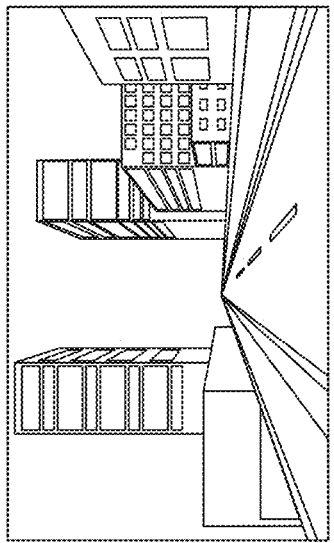
FIGS. 8A to 8D are diagrams for explaining correction information generation processing.
Figure 8B:
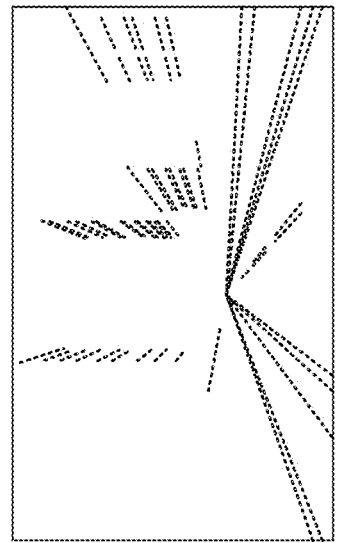
Figure 8C:
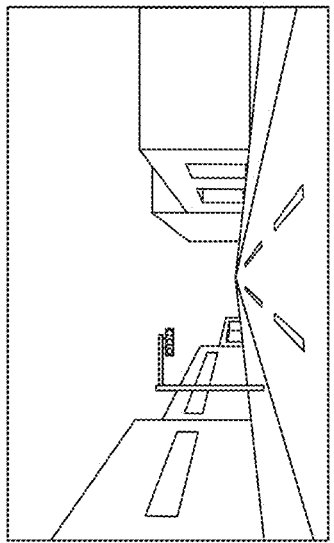
Figure 8D:
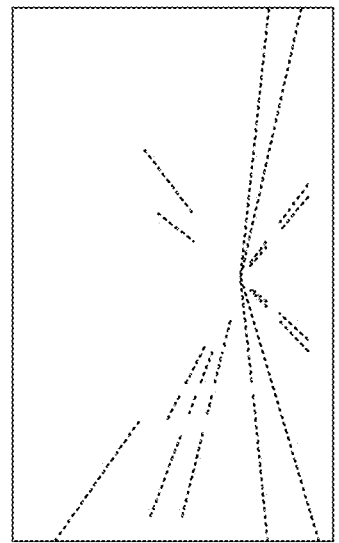

As an example of a method of generating the correction information Ic, a case where a coefficient of a polynomial function using a pixel position of the first image signal S21 as a variable is estimated using the plurality of pieces of correction purpose information of which the image angles and the subject distances are different will be described. FIGS. 8A and 8B are diagrams illustrating the first image signal S21 included in the second image group Sg2. FIGS. 8A and 8B are image signals imaged at different timings, respectively. FIG. 8C is a diagram illustrating the straight line portion extracted from FIG. 8A by a dotted line. FIG. 8D is a diagram illustrating the straight line portion extracted from FIG. 8B by a dotted line.

At the timing of FIG. 8A, there are few straight lines extracted on a right side of the image. On the other hand, at the timing of FIG. 8B, there are few straight lines extracted on a left side of the image. In the correction information generation processing (step S322) of the present exemplary embodiment, the correction information Ic is acquired using the correction purpose information extracted from the image signal pair imaged at the timing of FIG. 8A and the correction purpose information extracted from the image signal pair imaged at the timing of FIG. 8B. In the correction information generation processing (step S322), a linearity of the change in distance with respect to the position change on the image signal is evaluated for each straight line portion extracted in FIGS. 8C and 8D, and the two-dimensional distribution of the image side change amount is estimated using a coefficient of a polynomial function closest to linearity. A method of estimating the polynomial function will be described later using FIG. 9.

In a case where only the image signal pair imaged at the timing of FIG. 8A is used, with respect to the left side of the image, since there are many extracted straight line portions, it is possible to accurately estimate the image side change amount. On the other hand, with respect to the right side of the image, since there are few extracted straight line portions, an estimation accuracy of the image side change amount is reduced. That is, in a case where the image signal pair acquired at only one imaging timing is used, there is concern that data that is able to be applied in generating the correction information is insufficient and a correction accuracy is reduced. Therefore, in the distance measurement device 110 of the present exemplary embodiment, the reduction of the correction accuracy due to the imaging timing is suppressed by extracting the correction purpose information from the plurality of image signal pairs in the second acquisition unit 320.

Figure 9A:
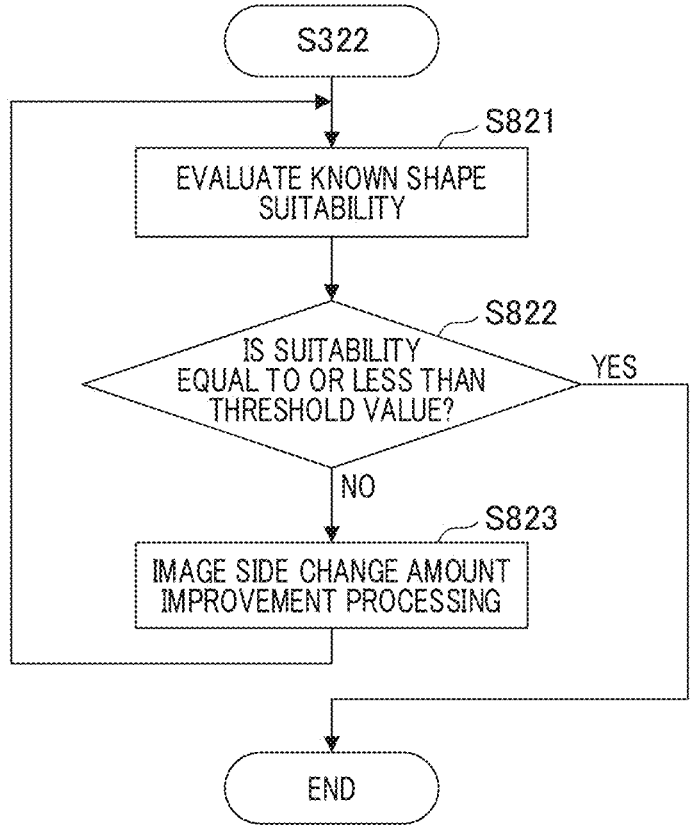
FIGS. 9A and 9B are diagrams for explaining a method of estimating a polynomial function.

The method of estimating the polynomial function indicating the image side change amount will be described using FIG. 9. FIG. 9A is a flowchart illustrating an operation of the correction information generation processing (step S322). In the correction information generation processing, the image side change amount is estimated from the state ((i) or (iii) of FIG. 6B) in which the change with time is generated in the imaging apparatus 100 and the correction information for causing the imaging apparatus 100 is in the state ((ii) of FIG. 6) in which the change with time is not generated in the imaging apparatus 100 is generated. In the present exemplary embodiment, the correction information generation processing of a case where the straight line portion is extracted as the known shape will be described.

In step S821, the second acquisition unit 320 corrects the distance information included in the correction purpose information by using the polynomial function (an initial coefficient is zero) indicating a provisionally set image side change amount and evaluates suitability with the known shape. Here, the suitability is an index indicating how much straight line the distance information of an object side corrected by applying the provisional image side change amount to the correction purpose information. The evaluation of the suitability is performed for each straight line portion, and an overall suitability is able to be evaluated, for example, by using an average value or a mean square value of the suitability of each straight line portion.

Figure 9B:
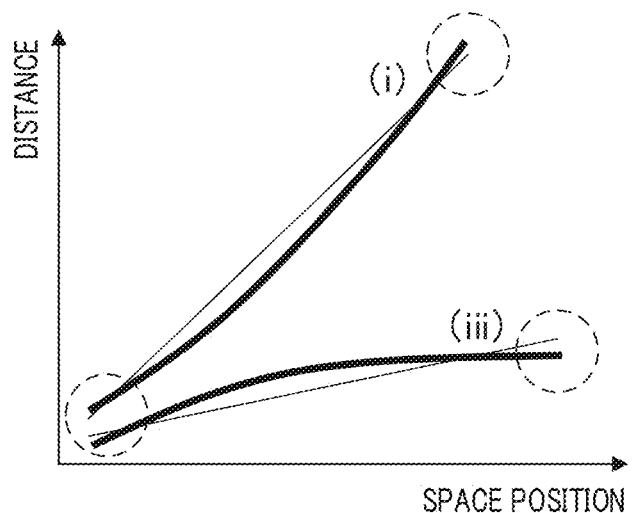

As a method of calculating the suitability, for example, there is a method of performing straight line fitting. FIG. 9B is a diagram for explaining the straight line fitting. In a case where there is data of (i) or (iii) indicated by a thick line in FIG. 9B, the straight line fitting (a thin line in FIG. 9B) is performed on the data. In addition, as shown by a circle of a broken line in FIG. 9B, it is possible to determine whether an upwardly convex curve is made or a downwardly convex curve is made from a magnitude relation by comparing the data on a side close to the straight line with the data on a side far from the straight line and set the suitability. In addition, in the comparison with the fitting data, only one of the short distance side and the long distance side may be used, but since there is a possibility that the distance information generated in the correction information generation processing (step S321) includes an error, it is desirable to determine the suitability using a plurality of points. In addition, the suitability may be evaluated using a square sum of differences from a result of the straight line fitting. Note that the method of calculating the suitability is not limited thereto, and any method may be used. In a case where the known shape is other than a straight line, the fitting is performed in consideration of the known shape, and the suitability may be calculated by characteristic peripheral data.

In step S822, the second acquisition unit 320 compares the suitability calculated in step S821 with a threshold value. In a case where the suitability is equal to or less than the threshold value, it is determined to be the known shape by the estimated image side change amount and the estimated image side change amount is set as the correction information. On the other hand, in a case where the suitability is greater than the threshold value, it is determined that it is necessary to improve the estimated image side change amount and the processing proceeds to step S823. Note that it may be determined so that the estimated image side change amount is set as the correction information when the suitability no longer improves even though the coefficient of the polynomial function is adjusted. Similarly, it may be determined so that the estimated image side change amount is set as the correction information when an update amount of the coefficient of the polynomial function becomes sufficiently small.

It is desirable to evaluate the suitability for all of the plurality of extracted known shape objects. For example, weighting optimization may be performed using information such as the distance change amount of the known shape subject, the number of pixels, and the reliability of the distance information. In addition, an upper limit value may be set for the number of times of repeating the processing from steps S821 to S823 and the estimated image side change amount may be set as the correction information.

In step S823, the second acquisition unit 320 performs processing for changing the coefficient of the polynomial function in order to improve the image side change amount. Thereafter, calculating the suitability in step S821 is repeated again and a final estimation value of the image side change amount is determined. In a method of changing the coefficient of the polynomial function, the change amount may be set in advance and the change amount is added or subtracted in a direction of improvement. In addition, feedback control such as proportional-integral-differential controller (PID) control may be used in order to improve the convergence value with less number of times of the repetition. In addition, when changing a plurality of variables, since individual improvement does not necessarily lead to improvement of the whole, a gradient method algorithm such as a steepest descent method may be used. However, since there is a possibility that the gradient method algorithm is merely a local solution, a method of obtaining a global optimum solution may be used.

In the present exemplary embodiment, a case where the image side change amount is approximated by the polynomial function has been described, but other functions may be used. In addition, for example, the correction distance information IdistC may be generated by performing a direct correction from the first distance information Idist1 by a preparation of a parameter table or the like, without calculating the image side change amount. In a case where the characteristics of the imaging optical system 120 changes with time due to the change in temperature and humidity or a vibration, the focal distance or the BL value as well as the image side change amount often changes. Therefore, even in a case where the focal distance or the BL value changes, since the relationship of Formula 2 breaks down, the relationship shown in (i) or (iii) of FIG. 6B deviates from the straight line. Therefore, the correction information may be created in consideration of not only the image side change amount but also the BL value or the change with time of the focal distance of the imaging optical system 120. In any case, it is possible to correct the change with time of multiple variables such as the image side change amount or the BL value over the entire region of the distance information rather than a part of the region, by acquiring the correction information Ic using the plurality of image signal pairs imaged at different timings included in the second image group. In addition, it is preferable that a degree of the polynomial function is set advance. However, in a case where the suitability is not improved when the degree that is set in advance is used, a polynomial function with a higher degree may be used.

In a case where the processing of step S320 is ended, the correction unit 330 corrects the first distance information Idist1 by using the correction information Ic by the correction processing (step S330). In the correction processing, some or all of the distance information of the first distance information Idist1 is corrected by using the image side correction amount included in the correction information Ic. That is, the image surface position of the imaging optical system 120 and the position of the imaging device 101 of the current state are determined from the estimated image side change amount, and the image surface position of the imaging optical system 120 and the position of the imaging device 101 of the current state are converted into the correction distance information IdistC indicating the subject distance by using Formula 2.

Figure 10:
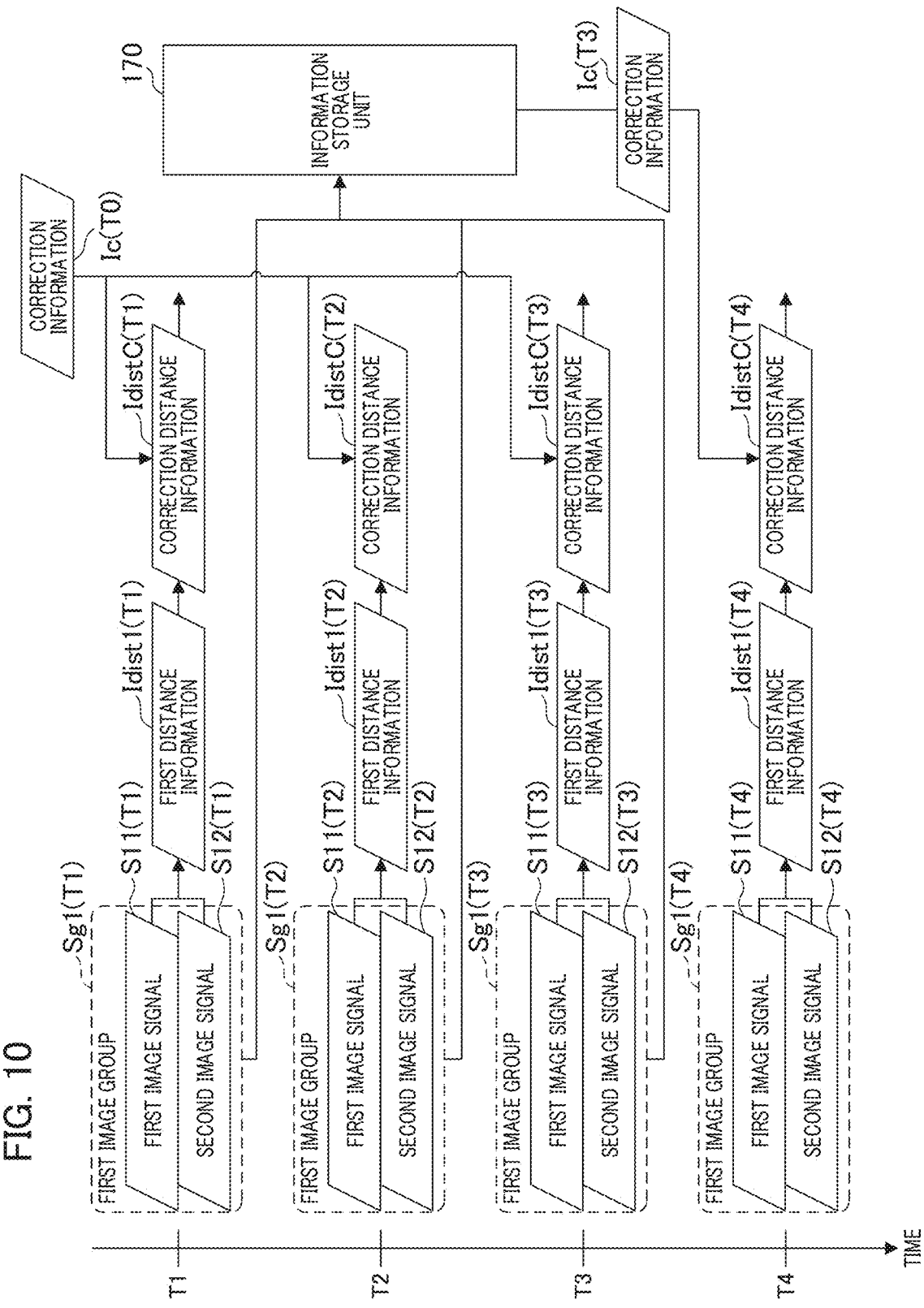
FIG. 10 is a data flow of processing of the distance measurement device.

A data flow of the processing performed by the distance measurement device 110 will be described using FIG. 10. Hereinafter, acquisition of the correction information Ic(T4) for correcting the first distance information Idist1(T4) acquired using the first image group Sg1(T4) imaged at a time T4 will be described.

First, at a time T1, the first acquisition unit 310 acquires the first image group Sg1(T1) from the imaging device 101. The first image group Sg1(T1) includes the first image signal S11(T1) and the second image signal S12(T1). The first acquisition unit 310 performs first acquisition processing (step S310) using the first image group Sg1(T1) and acquires the first distance information Idist1(T1). The second acquisition unit 320 performs second acquisition processing (step S320) using the second image group Sg2 acquired at a time before the time T1 and acquires the correction information Ic(T0). Next, the correction unit performs the correction processing (step S330), corrects the distance information of the first distance information Idist1(T1) using the correction information Ic(T0), and generates the correction distance information IdistC(T1). In addition, the first image group Sg1(T1) is stored in the information storage unit 170. Similarly, also at times T2 and T3, the correction distance information IdistC at each time is generated using the correction information Ic(T0), and the first image group Sg1 at each time is stored in the information storage unit 170.

Next, at a time T4, the first acquisition unit 310 acquires the first image group Sg1(T4) from the imaging device 101. In addition, the first acquisition unit 310 acquires the first distance information Idist1(T4) by the first acquisition processing (step S310). The second acquisition unit 320 selects the image signal pair imaged between the times T1 and T3 from the second image group Sg2 stored in the information storage unit 170 and acquires the correction information Ic(T3) by the second acquisition processing (step S320). Next, the correction unit 330 corrects the distance information of the first distance information Idist1(T4) using the correction information Ic(T3) by the correction processing (step S330) and generates the correction distance information IdistC(T4).

In addition, here, for the sake of explanation, the correction information Ic(T0) is used for correcting the first distance information at each of the times T1 to T3, but a predetermined image signal pair may be selected from the information storage unit 170 for each time and the correction information Ic may be acquired. In addition, considering that the change with time of the imaging apparatus 100 due to the change in temperature and humidity and the vibration is gentler than the a time interval for imaging the first image group Sg1, the timing at which the correction information Ic is acquired may be longer than the time interval for acquiring the first image group Sg1. For example, the first acquisition processing and the second acquisition processing are operated by different central processing units (CPUs) and the timing at which the correction information Ic is acquired is set to be longer than the time interval for acquiring the first image group Sg1. Therefore, it is possible to shorten a delay time from imaging the first image group Sg1 to generating and outputting the correction distance information IdistC.

Change in a surrounding environment of the imaging apparatus 100, or change with time due to heat generation during driving or the vibration is gentle change as compared with a periodic interval (so-called frame rate) at which the imaging apparatus 100 acquires the image signal. Therefore, the image side change amount is substantially the same amount within a predetermined time from the time T4 when the first image group Sg1 is acquired. That is, it is possible to accurately correct the first distance information by using the correction information estimated using only the image signal pair acquired within the predetermined time (in the above description, the times T1 to T3) from the second image group Sg2 stored in the information storage unit 170. Hereinafter, a time range within which the correction information is regarded as the same is referred to as correction information same time.

For example, in a case where FIGS. 8A and 8B are image signals acquired within the correction information same time, both straight line portions of FIGS. 8C and 8D are able to be used in calculating the image side change amount. As a result, the deviation of the position or the distance of the extracted straight line portion is reduced, and it is possible to accurately estimate the image side correction amount over the entire screen. That is, the distance measurement device 110 of the present exemplary embodiment reduces the deviation of the position or the number of the extracted known shape subjects by using the plurality of image signal pairs imaged within the correction information same time included in the second image group Sg2. In the present exemplary embodiment, it is possible to favorably correct the change with time of the imaging apparatus 100 by accurately estimating the image side change amount using the plurality of image signal pairs imaged within the correction information same time.

The correction information same time is able to be set in advance based on the temperature and humidity characteristics of the imaging apparatus 100 or resistance to the vibration. In addition, a temperature sensor may be disposed inside or in the vicinity of the imaging apparatus 100 and the correction information same time may be set according to temperature change detected by the temperature sensor. In addition, the correction information same time may be set according to a magnitude of a vibration detected by a vibration sensor or an impact sensor installed inside or in the vicinity of the imaging apparatus 100. For example, in a case where the temperature and humidity suddenly change, the correct correction information also gradually changes, and thus it is desirable to set the correction information same time to be short. Similarly, even in a case where a strong impact is applied to the imaging apparatus 100, since it is highly likely that the correct correction information is changing, it is desirable to set the correction information same time to be short.

As described using FIG. 4D, in the correction purpose information generation processing (step S321), the processing similar to the processing S311 to S315 performed in the first acquisition processing (step S310) is performed. When the first image group Sg1 is stored in the information storage unit 170 as the second image group Sg2 in order to avoid redundant processing and more efficiently generate the correction information Ic, the first distance information Idist1 may also be stored as a distance information group. In a case where the second image group Sg2 and the distance information group are stored in the information storage unit 170, the known shape subject detection processing (step S323) is performed using the second image group Sg2 in the correction purpose information generation processing (step S321). In addition, in the corresponding distance information detection processing (step S324), the distance information corresponding to the known shape subject detected in the known shape detection processing (step S323) is extracted from the distance information group and is set as the correction information.

In order to save a capacity of the information storage unit 170 and writing time, the correction information may be generated on the basis of the first image group Sg1 and the first distance information Idist1, and the correction purpose information may be stored in the information storage unit 170 as correction purpose information group. In a case where the correction purpose information group is stored in the information storage unit 170, the second acquisition unit 320 performs the correction information generation processing (step S322) based on the correction purpose information group acquired from the information storage unit 170 and acquires the correction information Ic. The correction purpose information group is information obtained by extracting only the information necessary for generating the correction information Ic from the second image group Sg2, and it is possible to reduce an information amount. Therefore, it is possible to reduce the capacity and the information writing time by storing the correction purpose information group in the information storage unit 170. In addition, in a case where the number or an amount of the pieces of correction purpose information stored in the information storage unit 170 is sequentially detected for each region on the image and it is determined that the amount is sufficient for generating the correction information, the correction information may be generated in a time shorter than the correction information same time.

The imaging apparatus 100 of the present exemplary embodiment is able to perform feedback control of the imaging optical system 120 or the imaging device 101 using the correction distance information IdistC generated by the distance measurement device 110 and it is possible to utilize the imaging apparatus 100 for more accurate focusing operation. In the feedback control, an optical system control unit (not shown) or an imaging device control unit (not shown) of the imaging apparatus 100 calculates a movement amount according to the correction distance information IdistC at an arbitrary image angle and moves the imaging optical system or the imaging device. Since the imaging apparatus 100 is able to accurately correct the distance information according to the change with time irrespective of an imaging scene, it is possible to more accurately adjust the focus with a single feedback. In addition, since highly accurate subject field information is able to be acquired using the correction distance information, it is possible to perform optimum strobe imaging by controlling a strobe (not shown) according to a distance range of the subject field.

Figure 11A:
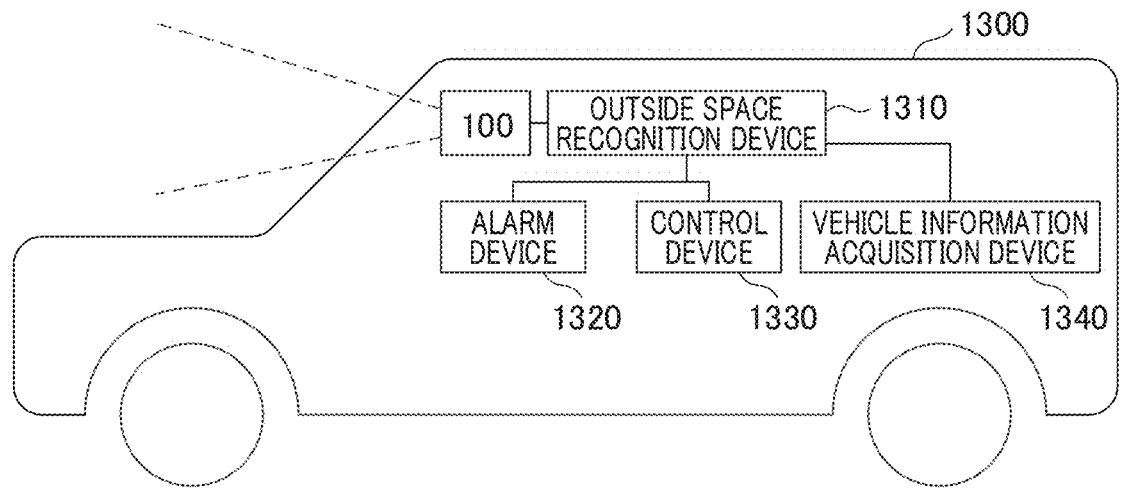
FIGS. 11A and 11B are diagrams for explaining a moving body including the distance measurement device.

In addition, the imaging apparatus 100 is able to be utilized as an information acquisition unit configured to allow an autonomously movable moving body (a robot, an automobile, a drone, or the like) to recognize an external environment. Hereinafter, an automobile as the autonomously movable moving body will be described as an example. FIG. 11A is a diagram schematically illustrating a configuration of the automobile as the moving body including the imaging apparatus 100 of the present exemplary embodiment. A vehicle 1300 that is an automobile includes the imaging apparatus 100, an outside space recognition device 1310, an alarm device 1320, a control device 1330, and a vehicle information acquisition device 1340.

The outside space recognition device 1310 recognizes an outside space based on the image signal acquired from the imaging apparatus 100 and the correction distance information generated by the distance measurement device 110 provided in the imaging apparatus 100. For example, the first image signal is acquired from the imaging apparatus 100 and recognizes that there is a preceding vehicle. In addition, a position of the preceding vehicle with respect to the vehicle 1300 is recognized on the basis of the correction distance information.

In addition, the outside space recognition device 1310 is connected to each of the alarm device 1320, the control device 1330, and the vehicle information acquisition device 1340. The outside space recognition device 1310 acquires information such as a vehicle speed (speed), a yaw rate, and a steering angle from the vehicle information acquisition device 1340 as vehicle information (information of the moving body). The control device 1330 controls the vehicle 1300 based on a recognition result of the outside space recognition device 1310. For example, in a case where a possibility of collision with the preceding vehicle is high as the recognition result of the outside space recognition device 1310, the control device 1330 controls the vehicle 1300 by performing such as braking, returning an accelerator, suppressing an output of an engine, or the like to avoid collision and reduce damage. The alarm device 1320 issues an alarm on the basis of the recognition result of the outside space recognition device 1310. For example, in a case where a possibility of collision with the preceding vehicle is high as the recognition result of the outside space recognition device 1310, the alarm device 1320 issues an alarm such as a sound and displays warning information on a screen of a car navigation system, a head up display, or the like. Alternatively, the alarm device 1320 gives a warning to a driver of the vehicle 1300 by giving a vibration to a seat belt or a steering wheel, or the like.

Figure 11B:
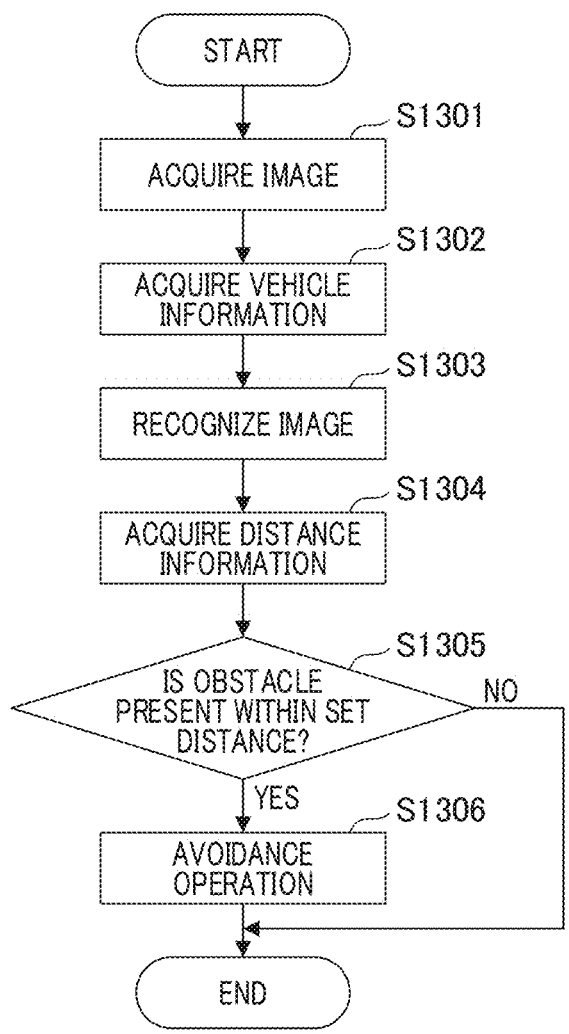

FIG. 11B is a flowchart illustrating collision avoidance processing as an operation example of a driving support system. First, in step S1301, the outside space recognition device 1310 acquires a plurality of image signals (for example, the first image signal and the second image signal) from the imaging apparatus 100. Next, in step S1302, the outside space recognition device 1310 acquires the information of the vehicle from the vehicle information acquisition device 1340.

In step S1303, the outside space recognition device 1310 performs feature analysis (recognition processing) on at least one of the plurality of acquired image signals. Specifically, the outside space recognition device 1310 analyzes a feature amount such as an amount or a direction of an edge in the image signal, a density value, a color, and a luminance value to recognize (detect) an object (an automobile, a pedestrian, a bicycle, a lane, a guardrail, a brake lamp, and the like). Note that the image feature amount analysis may be performed on each of the plurality of image signals. In addition, the image feature amount analysis may be performed on only a part (for example, only the first image signal) of the image signals among the plurality of image signals.

In step S1304, the outside space recognition device 1310 acquires distance information of an object present in the captured image signal from the distance measurement device 110 included in the imaging apparatus 100.

In step S1305, the outside space recognition device 1310 determines whether or not the object is within a setting that is set in advance, that is, determines whether or not an obstacle is present within a set distance, on the basis of the acquired distance information, and determines a possibility of collision of a forward direction or a backward direction. In a case where the obstacle is present within the set distance, it is determined that there is the possibility of the collision and the processing proceeds to step S1306. On the other hand, in a case where the obstacle is not present within the set distance, it is determined that there is no possibility of the collision and the present processing is ended.

In step S1306, the control device 1330 controls at least one of a movement direction and a movement speed of the vehicle 1300. For example, a control signal for generating a braking force on each wheel of the vehicle 1300 is generated and output, and an output of an engine is suppressed to avoid the collision with the preceding vehicle and reduce the collision possibility. In addition, the alarm device 1320 notifies the driver and the like of a danger by a sound, an image, a vibration, or the like. Thereafter, the present processing is ended.

It is possible to effectively detect the obstacle by the collision avoidance processing. That is, it is possible to accurately detect the obstacle, avoid the collision, and reduce damage.

The vehicle 1300 recognizes an outside space on the basis of the correction distance information and the image signal generated by the imaging apparatus 100 of the present exemplary embodiment and controls the vehicle. Since the distance measurement device 110 included in the imaging apparatus 100 is able to acquire correction distance information obtained by correcting the change with time favorably, it is possible to more stably recognize an external environment. Therefore, it is possible to recognize the outside space with higher accuracy and effectively control the vehicle, by using the distance measurement device 110 and the imaging apparatus 100 of the present exemplary embodiment. That is, it is possible to more effectively avoid the collision and reduce the damage due to the collision.

In addition, in the present exemplary embodiment, the collision avoidance based on the distance information has been described, however, in order to follow the preceding vehicle, maintain a center in a lane, or suppress a deviation from the lane, the distance measurement device 110 or the imaging apparatus 100 of the present exemplary embodiment is also able to be used. In addition, the distance measurement device 110 or the imaging apparatus 100 of the present exemplar) embodiment is able to be used in not only a driving support of the vehicle 1300 but also an autonomous operation of an automobile. The imaging apparatus 100 of the present exemplary embodiment is not limited to a vehicle such as an automobile, but is able to be applied to, for example, a moving body such as a ship, an aircraft, a drone, or an industrial robot. In addition, the imaging apparatus 100 of the present exemplary embodiment is able to be applied to not only the moving body but also an apparatus that widely uses object recognition such as a device used in an intersection monitoring system or an intelligent transportation system (ITS). For example, the imaging apparatus 100 of the present exemplary embodiment may be applied to an intersection monitoring camera that is a non-moving body in a traffic monitoring system.

Figure 12:
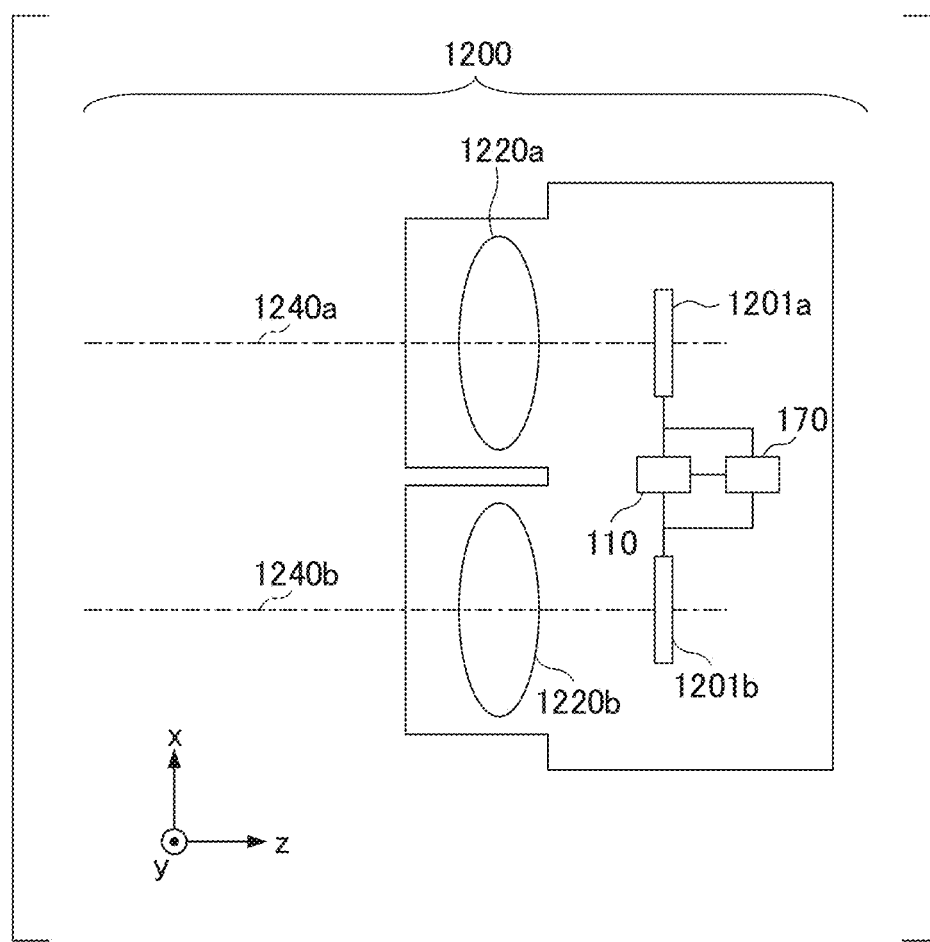
FIG. 12 is a diagram for explaining a configuration of an imaging apparatus.

In the present exemplary embodiment, the imaging apparatus having one imaging optical system and one imaging device has been described, but the present exemplary embodiment is not limited thereto, and the imaging apparatus may have a plurality of imaging optical systems or a plurality of imaging devices. For example, as in the imaging apparatus 1200 shown in FIG. 12, two imaging optical systems and two imaging devices may be provided. FIG. 12 is a diagram illustrating a configuration example of the imaging apparatus. The imaging apparatus 1200 includes a first imaging optical system 1220*a*, a second imaging optical system 1220*b*, a first imaging device 1201*a*, a second imaging device 1201*b*, the distance measurement device 110, and the information storage unit 170.

The first imaging optical system 1220*a* is a photographing lens of the imaging apparatus 1200 and forms an image of the subject on the first imaging device 1201*a* that is an imaging surface. Similarly, the second imaging optical system 1220*b* is a photographing lens of the imaging apparatus 1200 and forms an image of the subject on the second imaging device 1201*b* that is an imaging surface. The first imaging optical system 1220*a* has a plurality of lens groups and an aperture. Similarly, the second imaging optical system 1220*b* has a plurality of lens groups and an aperture. In addition, an optical axis 1240*a* of the first imaging optical system 1220*a* and an optical axis 1240*b* of the second imaging optical system 1220*b* are configured to be substantially parallel.

The first acquisition unit 310 of the distance measurement device 110 acquires the first image signal from the first imaging device 1201*a*, acquires the second image signal from the second imaging device 1201*b*, and generates the first distance information Idist1 on the basis of the acquired image signals. In addition, the correction unit 330 of the distance measurement device 110 is able to generate the correction distance information IdistC by correcting the first distance information Idist1 using the correction information Ic.

As described above, according to the present exemplary embodiment, it is possible to provide the distance measurement device capable of performing highly accurate distance measurement by correcting the distance measurement error with high accuracy due to the change with time of the imaging apparatus.

Second Exemplary Embodiment

<Configuration of Distance Measurement System>

Figure 13A:
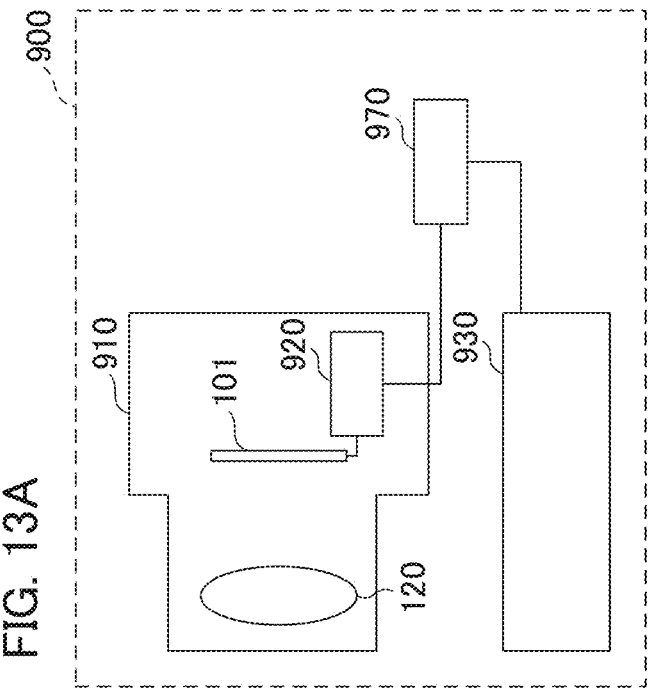
FIGS. 13A and 13B are diagrams for explaining a distance measurement system.

FIG. 13A is a diagram schematically illustrating the configuration of the distance measurement system 900). The distance measurement system 900 includes an imaging apparatus 910, a second distance measurement device 930, and an information storage unit 970. The imaging apparatus 910 is an imaging apparatus capable of imaging a plurality of images with different viewpoints and includes the imaging optical system 120, the imaging device 101, and a first distance measurement device 920. The second distance measurement device 930 is a distance measurement device of which a temperature dependence is lower than that of the first distance measurement device 920 included in the imaging apparatus 910.

<Configuration of Second Distance Measurement Device>

Figure 13B:
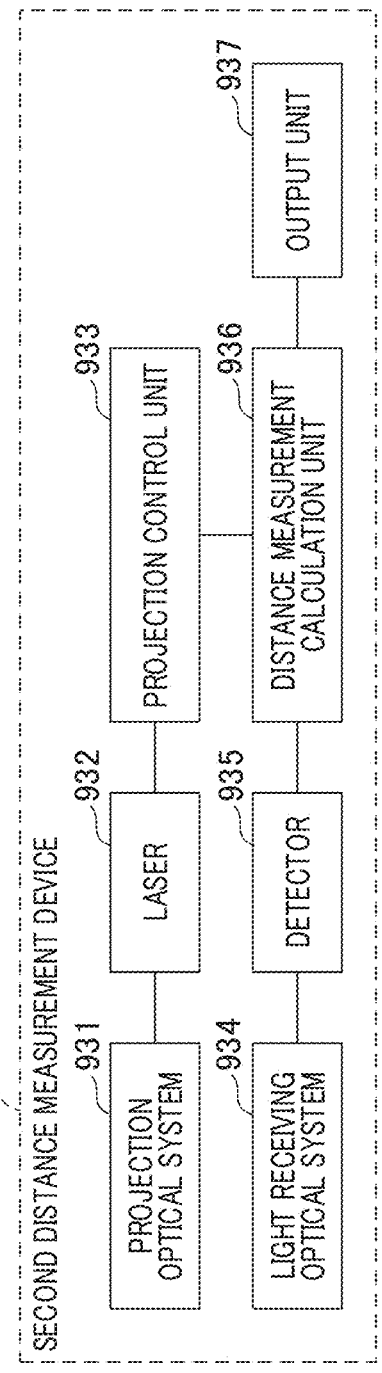

The second distance measurement device 930 of the present exemplary embodiment will be described. In the present exemplary embodiment, as an example of the second distance measurement device 930, a distance measurement device using a laser beam will be described. FIG. 13B is a diagram illustrating the configuration of the second distance measurement device 930. The second distance measurement device 930 includes a projection optical system 931, a laser 932, and a projection control unit 933 that are light projection systems, a light receiving optical system 934, a detector 935, and a distance measurement calculation unit 936 that are light receiving systems, and an output unit 937. The second distance measurement device 930 outputs second distance information indicating a distance to the subject by receiving return light of an irradiated laser beam. The second distance information output from the second distance measurement device 930 is stored in the information storage unit 970.

The laser 932 is a semiconductor laser diode that emits a laser beam of a pulse shape. The light from the laser 932 is collected and irradiated by the projection optical system 931 having a scanning system. In addition, the semiconductor laser is mainly used as the laser beam, but the laser beam is not particularly limited. In addition, the laser beam is one type of an electromagnetic wave with good directivity and convergence. Considering safety, it is preferable to use a laser beam of an infrared wavelength band.

The projection control unit 933 controls the emission of the laser beam of the laser 932. In the projection control unit 933, for example, a pulse signal for causing the laser 932 to emit the light is generated, and a driving signal of the pulse signal is input to the distance measurement calculation unit 936. The scanning optical system included in the projection optical system 931 repeatedly scans the laser beam emitted from the laser 932 in a horizontal direction at a predetermined period.

The laser beam emitted from the laser 932 hits the object (the subject) and is reflected from the object, and is input to the detector 935 through the light receiving optical system 934. The detector 935 includes a photodiode and outputs an electrical signal of a voltage value corresponding to a light intensity of the reflected light. The electric signal output from the detector 935 is input to the distance measurement calculation unit 936. The distance measurement calculation unit 936 measures a time from the output of the driving signal output from the projection control unit 933 to the laser 932 to the generation of the light receiving signal, that is a time difference between a time at which the laser beam is emitted and a time at which the reflected light is received, and calculates the distance to the subject. The distance to the subject calculated by the distance measurement calculation unit 936 is output as second distance information through the output unit 937.

Note that the scanning optical system in the projection optical system uses a polygon mirror, a galvano mirror, or the like. As the scanning optical system in the present exemplary embodiment, a laser scanner having a structure in which a plurality of polygon mirrors are stacked in a vertical direction and a plurality of laser beams arranged in the vertical direction are horizontally scanned is desirable. It is possible to acquire the distance to the object from which the irradiated laser beam is reflected by the operation described above.

The second distance measurement device 930 measures the subject distance by using a flight time of the light until the emitted laser beam is reflected from the subject and detected by the detector 935. Therefore, even though optical characteristics of the projection optical system 931 or the light receiving optical system 934 change due to the change in temperature and humidity and the vibration, an influence on the flight time of the light is small. That is, the change with time of the distance measurement result due to the change in temperature and humidity and the vibration of the second distance measurement device 930 is smaller than that of the distance measurement device 920.

<Description of First Distance Measurement Device>

Figure 14A:
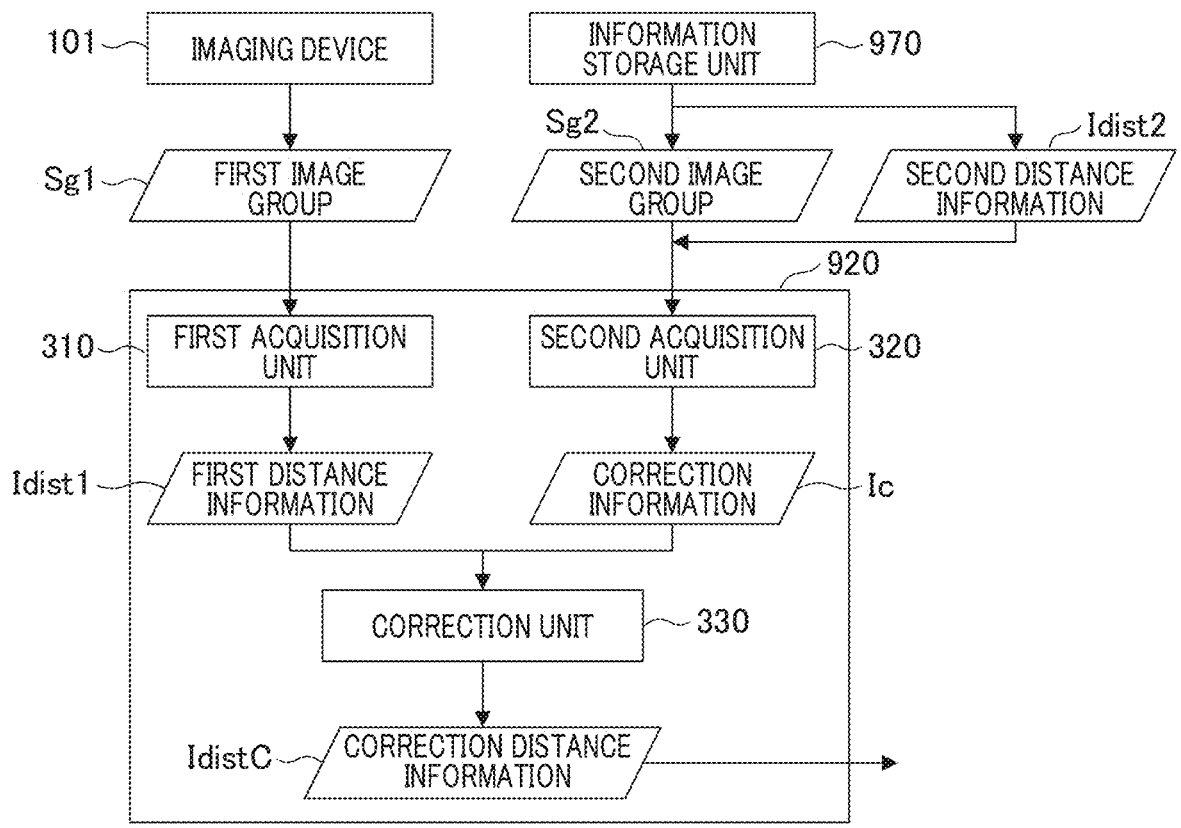
FIGS. 14A and 14B are diagrams for explaining a distance measurement system.

The first distance measurement device 920 of the present exemplary embodiment will be described. FIG. 14A is a block diagram illustrating a schematic configuration of the first distance measurement device 920. Hereinafter, a difference from the distance measurement device 110 of the first exemplary embodiment will be described.

The second acquisition unit 320 acquires the second distance information Idist2 and the second image group Sg2 stored in the information storage unit 970 and generates the correction information Ic using the second distance information Idist2 and the second image group Sg2. The correction unit 330 corrects the first distance information Idist1 using the correction information Ic generated using the second distance information Idist2 and the second image group Sg2 to generate the correction distance information IdistC obtained by correcting the distance measurement error due to the change with time of the imaging apparatus 910.

The second image group Sg2 includes the first image signal S21 and the second image signal S22 (both are referred to as an image signal pair) imaged at a plurality of timings different from those of the first image group Sg1 imaged using the imaging apparatus 910. The second distance information Idist2 is distance information acquired using the second distance measurement device 930. Similarly to the second image group Sg2, the second distance information Idist2 is distance information acquired at a plurality of timings different from those of the first image group Sg1.

Figure 14B:
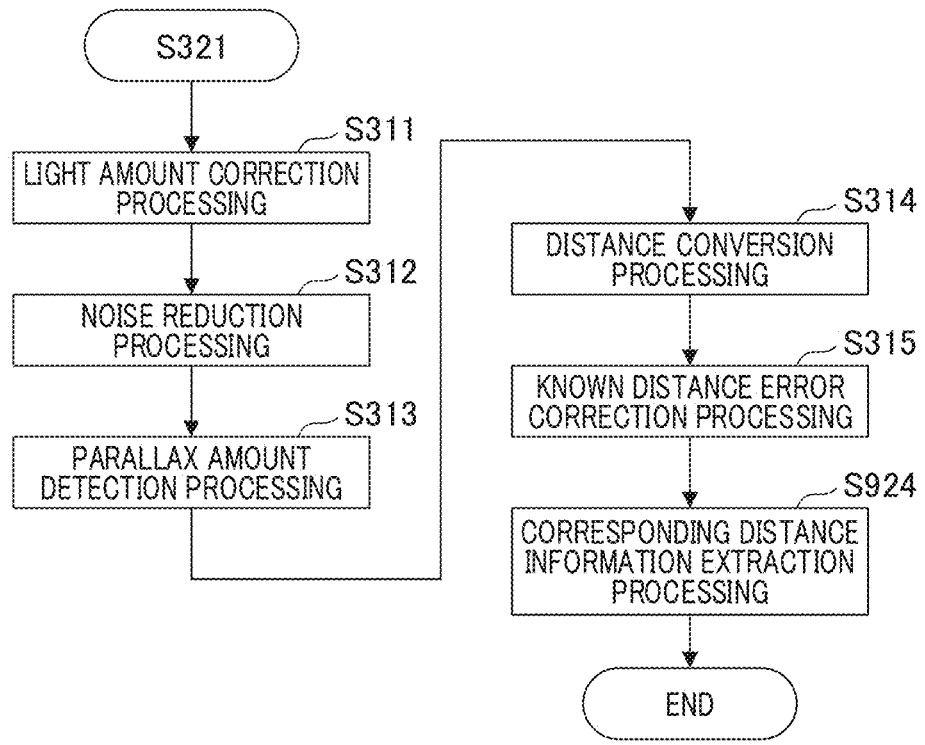

The second acquisition processing (step S320) performed by the second acquisition unit 320 will be described using FIGS. 4C and 14B. FIG. 4C is a flowchart illustrating an operation of the second acquisition processing (step S320). FIG. 14B is a flowchart illustrating details of the correction purpose information generation processing (step S321) in the second acquisition processing in the present exemplary embodiment. In addition, in the following description, it is assumed that the timing at which the image signal pair included in the second image group Sg2 is acquired and the timing at which the second distance information Idist2 is acquired are substantially the same.

In steps S311 to S315, a plurality of defocus amounts are generated as correction purpose distance information corresponding to each of the image signal pairs, by using the plurality of image signal pairs included in the second image group Sg2, by the processing contents similar to the first exemplary embodiment.

In step S924, the second acquisition unit 320 performs the corresponding distance information extraction processing. In the corresponding distance information extraction processing, the second acquisition unit 320 extracts the correction purpose distance information corresponding to the data position of the second distance information Idist2 and sets the correction purpose distance information as the correction purpose information together with the second distance information Idist2.

Figure 15A:
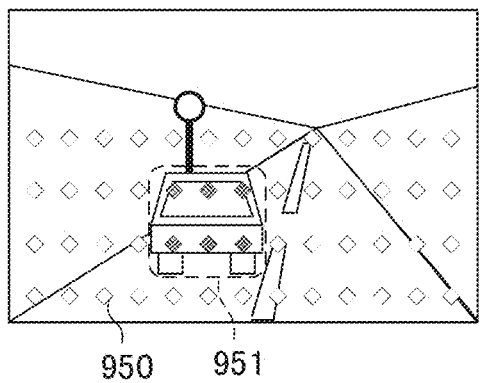
FIGS. 15A to 15C are diagrams for explaining corresponding distance information extraction processing and correction information generation processing.

The corresponding distance information extraction processing (step S924) will be specifically described using FIG. 15A. FIG. 15A is a diagram for explaining an aspect in which the data position of the second distance information Idist2 is superimposed on the first image signal S21 included in the second image group Sg2. Note that the second distance information Idist2 outside a field of view of the imaging apparatus 910 is not shown. A rhombus 950 is the data position of the second distance information Idist2.

Since the second distance measurement device 930 horizontally scans the plurality of lasers arranged in the vertical direction, a data density of the second distance information Idist2 is lower than that of the correction purpose distance information. Therefore, in the first distance measurement device 920 of the present exemplary embodiment, the data is thinned out from the correction purpose distance information while referring to data position of the second distance information Idist2, and the corresponding distance information corresponding to the second distance information Idist2 is generated.

The imaging apparatus 910 and the second distance measurement device 930 generate parallax due to different viewpoints. Therefore, when calculating the data position of the second distance information Idist2, it is desirable to shift the data position so as to be suitable for the field of view of the imaging apparatus 910 in consideration of the parallax according to the distance. In addition, a subject in the first image signal S21 may be detected and the distance information may be given for each subject using the second distance information Idist2. For example, in a case where a subject 951 surrounded by a broken line frame in FIG. 15A is detected using the first image signal S21, an average value of the second distance information Idist2 corresponding to the data position (a shaded rhombus) in the subject 951 is set as the distance information of the subject 951. In addition, the correction purpose distance information at the position corresponding to the subject 951 is extracted and is set as the correction purpose information together with the distance information of the subject 951. In a case where a plurality of subjects are detected, the correction information is generated for each subject. As a method of detecting the subject from the first image signal S21, the semantic segmentation described above or a method of learning and detecting a specific subject (for example, a person, an automobile, a sign, a building, or the like) from a database in advance is able to be used.

Figure 15B:
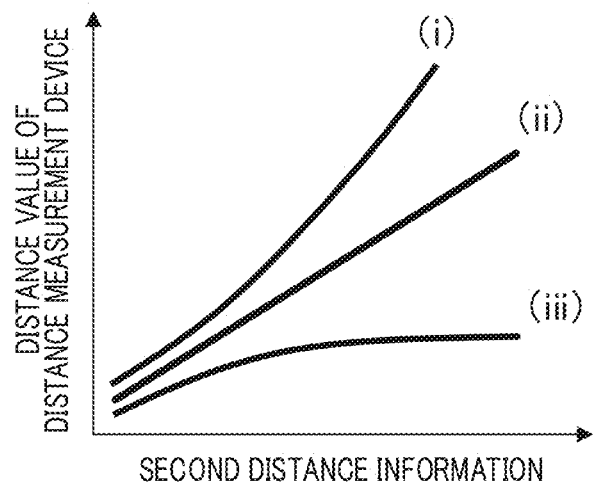

In the correction information generation processing (step S322), the correction unit 330 generates the correction information Ic for correcting the distance measurement error generated due to the change with time of the imaging apparatus 910 by using the correction purpose information generated in the correction purpose information generation processing (step S321). The correction purpose information includes the defocus amount generated using the second image group Sg2 as the distance information. FIG. 15B illustrates a result obtained by converting the defocus amount into the subject distance using Formula 2 described above and comparing the subject distance with the second distance information included in the correction purpose information.

In FIG. 15B, a horizontal axis is the second distance information included in the correction purpose information. A vertical axis is a distance value (hereinafter, referred to as a distance value of the distance measurement device) obtained by converting the distance information as the defocus amount included in the correction purpose information into the subject distance by Formula 2. In a case where the change with time does not occur in the imaging apparatus 910, a relationship between the second distance information and the distance value of the distance measurement device becomes a straight line as shown in (ii). On the other hand, in a case where the change with time is generated in the imaging apparatus 910 due to the influence of the change in temperature and humidity and the vibration, the relationship between the second distance information and the distance value of the distance measurement device becomes a curve as shown in (i) or (iii) and does not become the straight line. In order to cause the relationship between the second distance information and the distance value of the distance measurement device to be the straight line, it is necessary to correctly estimate a two-dimensional distribution of a variation of a plurality of conversion coefficients (the BL value, the image side change amount, the focal distance of the imaging optical system 120) for converting the parallax amount due to the change with time of the imaging apparatus 910 into the distance value of the first distance measurement device 920 and correct the error.

In order to estimate a change amount with time of each conversion coefficient, in the correction information generation processing (step S322), a coefficient when each conversion coefficient is approximated by a function in which the pixel position of the imaging device 101 is used as a variable is estimated. That is, the coefficient of the function is estimated so that the relationship of FIG. 15B becomes the straight line. Hereinafter, a method of estimating the coefficient of the function by evaluating a suitability of a result obtained by performing a straight line approximation on the relationship of FIG. 15B will be described. As the function, for example, a polynomial function is able to be used.

Figure 15C:
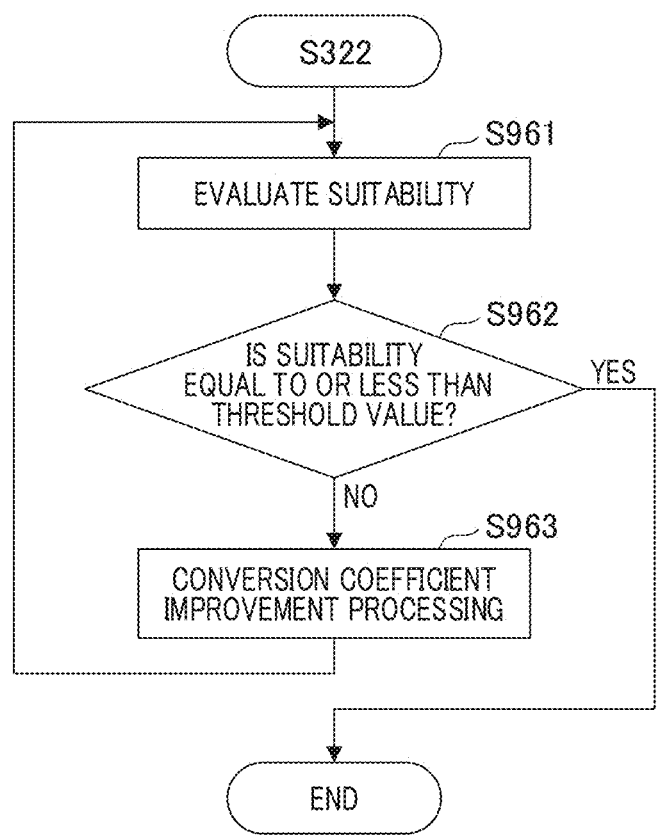

Supplementary FIG. 15C is a flowchart illustrating details of positive information generation processing (step S322). In step S961, the correction unit 330 evaluates the suitability of the result obtained by performing the straight line approximation on the relationship of FIG. 15B. Here, as a method of evaluating the suitability, for example, similarly to the first exemplary embodiment, there is a method of performing the straight line fitting. The suitability is evaluated by comparing the result of the straight line fitting with both of the short distance side and the long distance side. In addition, the suitability may be evaluated using a square sum of differences from the result of the straight line fitting. Note that the method of evaluating the suitability is not limited thereto, and the suitability may be evaluated by any method.

In step S962, the correction unit 330 compares the suitability calculated in step S961 with a threshold value. In a case where the suitability is equal to or less than the threshold value and it is able to be determined that the relationship of FIG. 15B becomes the straight line by the estimated coefficient of the function, the coefficient of the function indicating each of the estimated conversion coefficients is set as the correction information and the present processing is ended. On the other hand, in a case where the suitability is greater than the threshold value, the processing proceeds to step S963.

In step S963, the correction unit 330 performs processing for adjusting the coefficient of the function in order to improve the suitability. Thereafter, in the step S961, the calculation of the suitability is repeated again, and a two-dimensional distribution of each of finally estimated conversion coefficients is determined. A certain change amount is set in advance and the change amount is added or subtracted in an improvement direction to change the coefficient. In addition, feedback control such as PID control may be used in order to improve the convergence value with less number of times of the repetition. When changing a plurality of coefficients, since individual improvement does not necessarily lead to improvement of the whole, a gradient method algorithm such as a steepest descent method may be used. However, since there is a possibility that the gradient method algorithm is merely a local solution, a method of obtaining a global optimum solution may be used.

Note that it may be determined that the coefficient of the function indicating each of the estimated conversion coefficients is set as the correction information when the suitability no longer improves even though the coefficient of the function is adjusted. Similarly, it may be determined so that the coefficient of the function indicating each of the estimated conversion coefficients is set as the correction information when an update amount of the coefficient of the function becomes sufficiently small. In addition, an upper limit value may be set for the number of times of repeating the processing from steps S961 to S963 and the estimated image side change amount may be set as the correction information.

In the correction information generation processing (step S322), an estimation value of the plurality of conversion coefficients is generated as the correction information Ic. In addition, as the correction information, a two-dimensional distribution of each conversion coefficient created using the estimated coefficient of the function may be used, or the estimated coefficient of the function may be set as the correction information. Note that it is not always necessary to treat the conversion coefficient of which the image angle dependency of the change amount with time is low as the two-dimensional distribution. For example, a paraxial amount may be used as the focal distance of the imaging optical system 120 and may be a uniform value independent of the image angle.

The correction unit 330 corrects some of or the entire distance information of the first distance information Idist using the correction information Ic by the correction processing (step S330). That is, the relationship between the parallax amount and the defocus amount of a current state, and the focal distance and an image surface position of a current state of the imaging optical system 120 are determined from the correction information Ic, and the correction distance information IdistC indicating the distance from the subject to the imaging apparatus 100 is generated using Formula 2.

The correction information Ic of the present exemplary embodiment is generated based on various scenes in which the distances at which the subject is positioned and the image angles are different, using the second image group Sg2 and the second distance information acquired from the second distance measurement device 930. The second distance measurement device 930 is a distance measurement device of which the change with time due to the change in temperature and humidity and the vibration is less than that of the first distance measurement device 920. Therefore, even in a case where there are the plurality of conversion coefficients for converting the parallax amount into the subject distance, it is possible to estimate the plurality of conversion coefficients with high accuracy regardless of the imaging timing and it is possible to accurately correct the distance measurement error due to the change with time of the imaging apparatus 100.

In the present exemplary embodiment, it is described that the second distance information Idist2 and the image signal pair included in the second image group Sg2 are acquired at substantially the same timing, but the second distance information Idist2 and the image signal pair included in the second image group Sg2 may be acquired at different timings. In a case where the timings are different, for example, it is possible to generate information acquired at substantially the same timing by interpolating one with shorter acquisition interval in a time direction. As an example of an interpolation method, a linear interpolation is able to be used. For example, in a case where the interval of acquiring the second distance information is short, only a region where the distance change in the time direction is small is also able to be used. In addition, information with the closest acquisition time is also able to be handled as the information acquired at the corresponding timing.

In the present exemplary embodiment, a mode in which the plurality of conversion coefficients are estimated and the distance information is corrected using the conversion coefficients has been described. However, for example, the correction distance information IdistC may be generated by performing a direct correction from the first distance information Idist1 by a preparation of a parameter table or the like. Even in this case, the distance measurement device of the present exemplary embodiment acquires the correction information Ic by using the plurality of pieces of second distance information acquired at different timings and the plurality of image signal pairs imaged at different timings included in the second image group. It is possible to correct the change with time of the plurality of conversion coefficients with high accuracy over the entire region of the distance information rather than a part of the region, by using the plurality of pieces of second distance information and image signal pairs.

As described using FIG. 14B, in the correction purpose information generation processing (step S321), the processing similar to the processing S311 to S315 performed in the first acquisition processing (step S310) is performed. When the first image group Sg1 is stored in the information storage unit 970 as the second image group Sg2 in order to avoid redundant processing and more efficiently generate the correction information Ic, the first distance information Idist may also be stored as a distance information group.

In order to save a time for writing information in the information storage unit 970 and a time for reading information from the information storage unit 970, only information satisfying a predetermined condition may be extracted from the first distance information Idist1 and may be stored in the information storage unit 970. For example, as the predetermined condition, a plurality of set distances may be set in advance, and in a case where the second distance information Idist2 satisfies the set distance, the first distance information Idist1 of the corresponding region may be extracted. Since the information stored in the information storage unit 970 corresponds to only a partial region of the first distance information Idist1, an information amount is able to be reduced.

The imaging apparatus 100 of the present exemplary embodiment is able to perform feedback control of the imaging optical system 120 or the imaging device 101 using the correction distance information IdistC generated by the distance measurement device 920 and it is possible to utilize the imaging apparatus 100 for more accurate focusing operation. In the feedback control, an optical system control unit (not shown) or an imaging device control unit (not shown) of the imaging apparatus 100 calculates a movement amount according to the correction distance information IdistC at an arbitrary image angle and moves the imaging optical system or the imaging device. Since the imaging apparatus 100 is able to accurately correct the distance information according to the change with time irrespective of an imaging scene, it is possible to more accurately adjust the focus with a single feedback. In addition, since highly accurate subject field information is able to be acquired using the correction distance information, it is possible to perform optimum strobe imaging by controlling a strobe (not shown) according to a distance range of the subject field.

In addition, the distance measurement system 900 is able to be utilized as information acquisition unit for allowing a moving body (a robot, an automobile, a drone, or the like) capable of autonomously creating an action plan to recognize an external environment. For example, in FIG. 11A, the distance measurement system 900 is able to be mounted on the vehicle 1300 instead of the imaging apparatus 100. The outside space recognition device 1310 recognizes an outside space based on the correction distance information generated by the distance measurement device 110 provided in the distance measurement system 900, the image signal acquired from the imaging apparatus 910, and the second distance information generated by the second distance measurement device. Since the outside space recognition device 1310 is able to acquire the correction distance information obtained by favorably correcting the change with time from the distance measurement device 110, it is possible to more stably recognize an external environment.

As described above, according to the present exemplary embodiment, it is possible to provide the distance measurement device capable of performing highly accurate distance measurement by correcting the distance measurement error with high accuracy due to the change with time of the imaging apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-207992, filed Oct. 27, 2017, which is hereby incorporated by reference wherein in its entirety.

What is claimed is:

1. A distance measurement device comprising:
    a processor; and
    a memory storing a program which, when executed by the processor, causes the processor to execute:
    acquiring first distance information on the basis of a first image group imaged at different viewpoints and acquire second distance information on the basis of a second image group captured at a timing different from the first image group;
    calculating correction information of the distance information on the basis of the second image group; and
    correcting the first distance information on the basis of the correction information,
    wherein the acquiring calculates a parallax amount at a plurality of pixel positions on the basis of a plurality of images captured at different viewpoints and acquires the distance information using the parallax amount and a conversion coefficient,
    wherein the correcting corrects the first distance information on the basis of the correction information, and
    wherein images of the second image group are images captured within a predetermined time set according to a temperature or a magnitude of a vibration of an imaging apparatus that captures the first and second image groups, from a timing at which images of the first image group are captured.

2. The distance measurement device according to claim 1, wherein the second acquisition unit detects a specific subject from the second image group and calculates the correction information on the basis of information on the detected specific subject.

3. The distance measurement device according to claim 2, wherein the specific subject is a subject of which a shape is known, and
the second acquisition unit calculates the correction information on the basis of the shape of the detected specific subject.

4. The distance measurement device according to claim 2, wherein the first acquisition unit acquires the distance information for each region corresponding to the subject, and
the second acquisition unit detects the specific subject for each region and acquires the correction information for each region.

5. The distance measurement device according to claim 1, wherein a plurality of images used by the second acquisition unit are images captured within a predetermined time from a timing at which a plurality of images used by the first acquisition unit are captured.

6. The distance measurement device according to claim 5, wherein the second acquisition unit sets the predetermined time according to a temperature or a magnitude of a vibration of an imaging apparatus that captures the plurality of images.

7. The distance measurement device according to claim 1, wherein the second acquisition unit calculates the correction information on the basis of the second image group and distance information measured by a distance measurement device of which a temperature dependence is lower than a temperature dependence of the distance measurement device.

8. A method of controlling a distance measurement device, the method comprising:
acquiring distance information on the basis of a plurality of images imaged at different viewpoints;
calculating correction information of the distance information on the basis of a plurality of images captured at a timing different from a timing at which the plurality of images are captured; and
correcting the distance information on the basis of the correction information,
wherein a parallax amount is calculated at a plurality of pixel positions on the basis of a plurality of images captured at different viewpoints and acquires the distance information using the parallax amount and a conversion coefficient,
wherein the first distance information is corrected on the basis of the correction information, and
wherein images of the second image group are images captured within a predetermined time set according to a temperature or a magnitude of a vibration of an imaging apparatus that captures the first and second image groups, from a timing at which images of the first image group are captured.

9. A non-transitory storage medium on which is stored a computer program for causing a computer of a distance measurement device to execute a control method, the method comprising:
acquiring first distance information on the basis of a first image group imaged at different viewpoints and acquire second distance information on the basis of a second image group imaged at a timing different from the first image group;
calculating correction information of the distance information on the basis of the second image group; and
correcting the first distance information on the basis of the correction information,
wherein the acquiring calculates a parallax amount at a plurality of pixel positions on the basis of a plurality of images captured at different viewpoints and acquires the distance information using the parallax amount and a conversion coefficient,
wherein the correcting corrects the first distance information on the basis of the correction information, and
wherein images of the second image group are images captured within a predetermined time set according to a temperature or a magnitude of a vibration of an imaging apparatus that captures the first and second image groups, from a timing at which images of the first image group are captured.

* * * * *